United States Patent
Okamoto

(10) Patent No.: US 8,372,317 B2
(45) Date of Patent: Feb. 12, 2013

(54) METHOD OF CASTING PLASTIC LENS STARTING MATERIAL LIQUID AND CASTING APPARATUS AND METHOD OF MANUFACTURING PLASTIC LENS

(75) Inventor: Yasuhisa Okamoto, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 479 days.

(21) Appl. No.: 12/529,156

(22) PCT Filed: Feb. 28, 2008

(86) PCT No.: PCT/JP2008/053571
§ 371 (c)(1),
(2), (4) Date: Oct. 8, 2009

(87) PCT Pub. No.: WO2008/108280
PCT Pub. Date: Sep. 12, 2008

(65) Prior Publication Data
US 2010/0032852 A1 Feb. 11, 2010

(30) Foreign Application Priority Data
Feb. 28, 2007 (JP) .................................. 2007-050674

(51) Int. Cl.
*B29D 11/00* (2006.01)
(52) U.S. Cl. ........ 264/1.1; 264/40.7; 425/147; 425/150; 425/808
(58) Field of Classification Search .................. 264/1.1, 264/40.1, 40.7, 297.6, 349; 425/145, 147, 425/150, 808
See application file for complete search history.

(56) References Cited

U.S. PATENT DOCUMENTS
| | | | | |
|---|---|---|---|---|
| 4,594,064 A | * | 6/1986 | Anderson | 425/145 |
| 5,605,656 A | | 2/1997 | Sasano | |
| 6,127,505 A | * | 10/2000 | Slagel | 528/61 |

FOREIGN PATENT DOCUMENTS
| | | |
|---|---|---|
| JP | 2006-218678 A | 8/2006 |
| JP | 2006-231600 A | 9/2006 |
| WO | 95/08754 A1 | 3/1995 |

* cited by examiner

*Primary Examiner* — Mathieu D. Vargot
(74) *Attorney, Agent, or Firm* — Sughrue Mion, PLLC

(57) ABSTRACT

A method of casting a plastic lens starting material liquid using a casting apparatus comprising at least a mixing and discharging part and a casting part, and casting a plastic lens starting material liquid sequentially into multiple casting molds. Discharge of the plastic lens starting material liquid from the mixing and discharging part is halted based on a discharge halt preparation completion signal transmitted by the casting part, the discharge that has been halted is recommenced (1) at least based on a discharge recommencement preparation completion signal transmitted by the casting part or (2) by reception by the mixing and discharging part of a forced discharge start signal transmitted upon elapsing a predetermined time following halting of the discharge or following reception of the discharge halt preparation completion signal without transmission of a discharge recommencement preparation completion signal by the casting part, and the stirring in the mixing and discharging part is continued during the period when the discharge is halted.

17 Claims, 18 Drawing Sheets

Mixing and discharging part 15

Figure 1:
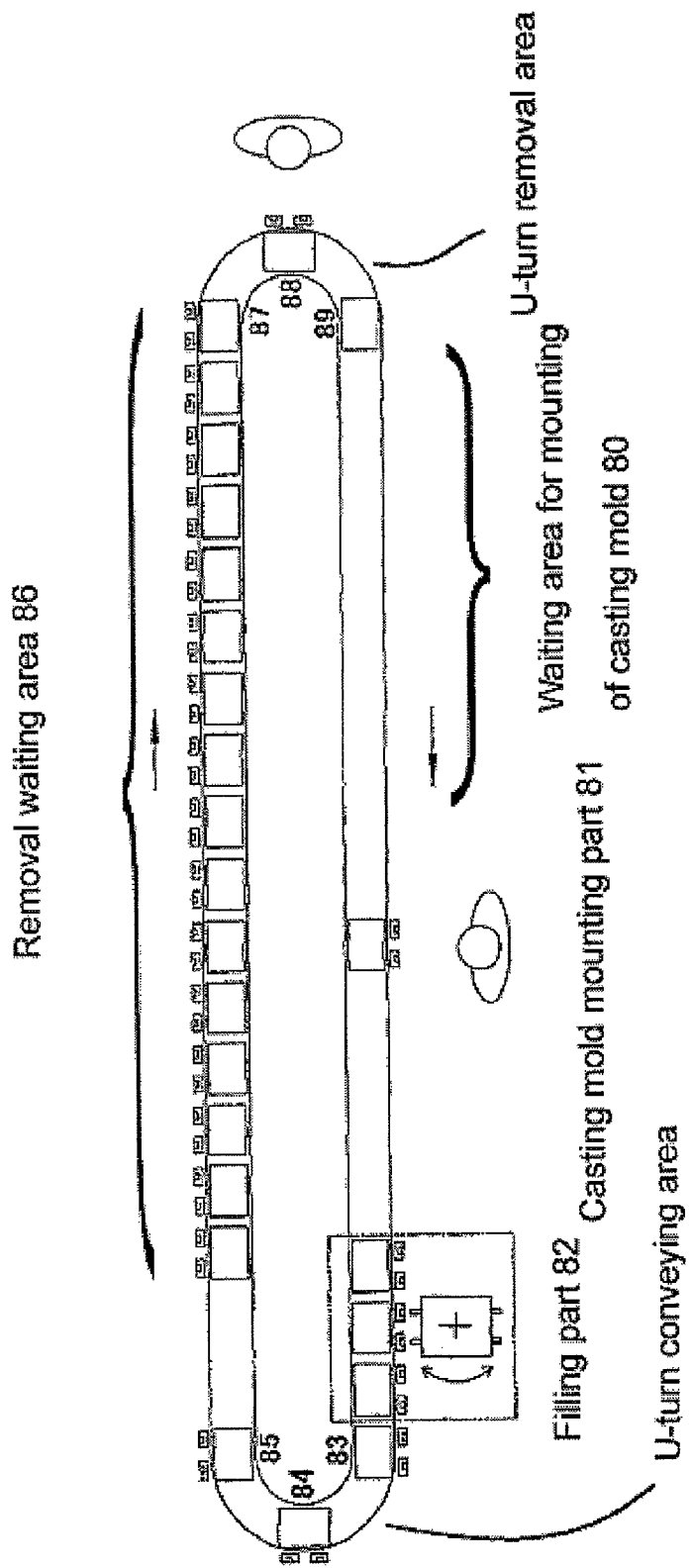

METHOD OF CASTING PLASTIC LENS STARTING MATERIAL LIQUID AND CASTING APPARATUS AND METHOD OF MANUFACTURING PLASTIC LENS

CROSS-REFERENCE TO RELATED APPLICATIONS

This application claims the benefit of priority to Japanese Patent Application No. 2007-050674 filed on Feb. 28, 2007, which is expressly incorporated herein by reference in its entirety.

TECHNICAL FIELD

The present invention relates to a method and apparatus of casting a highly viscous plastic lens starting material liquid with a rapid initial rate of polymerization in a casting mold. More particularly, it relates to a method and apparatus of casting a plastic lens starting material liquid, suited to the casting of a mixed liquid comprised of an isocyanate terminal prepolymer component (A) and an aromatic diamine component (B), in a casting mold.

The present invention further relates to a method of manufacturing a plastic lens by casting a plastic lens starting material liquid in a casting mold by the above method and cast-polymerizing to obtain a plastic lens.

BACKGROUND TECHNIQUE

Known methods of manufacturing plastic lenses include the cast polymerization method, in which a polymerizable plastic lens starting material liquid is cast into a casting mold and polymerized within the casting mold. To mass produce the plastic lens by cast polymerization, the steps of mixing multiple polymerizable components in a mixer and sequentially casting a mixed liquid discharged from the mixer into casting molds that are conveyed to a casting position are continuously conducted. When the initial polymerization rate of the plastic lens starting material liquid is relatively slow, the premixed liquid of plastic starting material liquid containing polymerizing components can be stockpiled in a tank or the like, the mixed liquid cast into a casting mold, and the fully cast casting mold conveyed from the casting position, with discharge of the mixed liquid being halted until the next casting mold is conveyed to the casting position. However, with the high-viscosity plastic lens starting material liquids described in Japanese Unexamined Patent Publication (KO-KAI) No. 2004-291606 or English language family member US2005/0200033A1, Japanese Unexamined Patent Publication (KOKAI) No. 2006-205710 or English language family member US2008/0018005A1, and Japanese Unexamined Patent Publication (KOKAI) No. 2006-231600, which are expressly incorporated herein by reference in their entirety, which have rapid initial polymerization rates, casting was required immediately after mixing in the mixer when the conventional casting method is employed. This is because once the discharge from the mixer has been halted, the mixed liquid remaining in the mixer during the halt continues to polymerize. Thus, immediately following recommencement of discharge, the mixed liquid that has become highly viscous within the mixer is cast into the casting mold, causing a problem in the form of optical defects in the lens obtained. Alternatively, progression of polymerization of the mixed liquid within the mixer makes it difficult to recommence discharge.

The above-described problems can be avoided by not halting discharge of the mixed liquid from the mixer after recommencing casting of the mixed liquid. However, the mixed liquid continues to flow out during the period when a casting mold that has been fully loaded with mixed liquid is conveyed away from the casting position and the next casting mold is conveyed in, the mixed liquid that has flowed out is not cast into the casting mold. As a result, the quantity of starting material that is cast into the casting mold, that is, the effective use level, becomes small.

DISCLOSURE OF THE INVENTION

Accordingly, the present invention was devised with the object of providing a means of providing a plastic lens affording good optical characteristics from a plastic starting material liquid of high viscosity having a rapid initial polymerization rate that makes efficient use of the starting material.

The present inventors conducted extensive research to achieve the above-stated object. As a result, they discovered that by both continuing to stir the starting material liquid in the mixing and discharging part while discharge of the plastic starting material liquid from the mixing and discharging part was halted and controlling the discharge of plastic lens starting material liquid from the mixing and discharging part based on a signal from the plastic starting material liquid casting part, it was possible to provide a plastic lens affording good optical characteristics while reducing the amount of wasted starting material liquid. The present invention was devised on that basis.

The present invention provides the following method of casting a plastic lens starting material liquid.

A method of casting a plastic lens starting material liquid using a casting apparatus comprising at least a mixing and discharging part and a casting part, comprising mixing a plastic lens starting material liquid by stirring in the mixing and discharging part and discharging the mixed plastic lens starting material liquid from the mixing and discharging part, and, at least during a period when the plastic lens starting material liquid is discharged from the mixing and discharging part, continuously conducting supply of the plastic lens starting material liquid to the mixing and discharging part, mixing the supplied plastic lens starting material liquid in the mixing and discharging part, and discharging the mixed plastic lens starting material liquid from the mixing and discharging part, and in the casting part, casting the plastic lens starting material liquid sequentially into multiple casting molds by conducting conveying the casting mold to a casting position, casting the plastic lens starting material liquid discharged from the mixing and discharging part into the casting mold conveyed to the casting position, and conveying the casting mold into which the plastic lens starting material liquid has been cast away from the casting position repeatedly multiple times, characterized by, halting the discharge of the plastic lens starting material liquid from the mixing and discharging part based on a discharge halt preparation completion signal transmitted by the casting part, recommencing the discharge that has been halted (1) at least based on a discharge recommencement preparation completion signal transmitted by the casting part or (2) by reception by the mixing and discharging part of a forced discharge start signal transmitted upon elapsing a predetermined time following halting of the discharge or following reception of the discharge halt preparation completion signal without transmission of a discharge recommencement preparation completion signal by the casting part, and continuing the stirring in the mixing and discharging part during the period when the discharge is halted.

One embodiment of the present invention provides:

the above method of casting a plastic lens starting material liquid, in which the casting apparatus further comprises a signal processing means that generates a signal transmitted to the mixing and discharging part and transmits the signal to the mixing and discharging part;

the above method of casting a plastic lens starting material liquid, wherein the mixing and discharging part halts the discharge by reception of a discharge halt signal generated based on the discharge halt preparation completion signal;

the above method of casting a plastic lens starting material liquid, wherein a discharge preparation completion signal is received by the signal processing means, and the signal processing means generates a discharge halt signal based on the discharge preparation completion signal that has been received and transmits the discharge halt signal that has been generated to the mixing and discharging part;

the above method of casting a plastic lens starting material liquid, wherein, in the above (1), the mixing and discharging part recommences the discharge by reception of a discharge recommencement signal generated based on the discharge recommencement preparation completion signal;

the above method of casting a plastic lens starting material liquid, wherein the discharge recommencement preparation completion signal is received by the signal processing means, and the signal processing means generates a discharge recommencement signal based on the discharge recommencement preparation completion that has been received and transmits the discharge recommencement signal that has been generated to the mixing and discharging part;

the above method of casting a plastic lens starting material liquid, wherein the signal processing means comprises a discharge halt time measuring element that measures a time that has elapsed following the halting of discharge or the reception of a discharge halt preparation completion signal and a storage element that stores the predetermined time, and, in the above (2), the discharge is recommenced by reception by the mixing and discharging part of the forced discharge start signal transmitted by the signal processing means upon elapsing of the predetermined time stored in the storage element without reception of a discharge recommencement signal transmitted by the casting part;

the above method of casting a plastic lens starting material liquid, wherein the discharge recommencement preparation completion signal is transmitted by detection by the casting part of the positioning of the casting mold to be cast with a plastic lens starting material liquid at a casting position;

the above method of casting a plastic lens starting material liquid, wherein the discharge halt preparation completion signal is transmitted by detection by the casting part of attainment of the liquid level of the plastic lens starting material liquid that has been cast in the casting mold to a predetermined position within the casting mold;

the above method of casting a plastic lens starting material liquid, wherein the stirring of the plastic lens starting material liquid is carried out by rotating a stirrer comprised in the mixing and discharging part;

the above method of casting a plastic lens starting material liquid, wherein stirring is conducted during the period when the discharge is halted with a rotational speed lower than that in the stirring before the discharge halt, and then the rotational speed is increased to restore to the rotational speed before the discharge halt;

the above method of casting a plastic lens starting material liquid, wherein the signal processing means comprises a rotational speed monitoring element obtaining information of a rotational speed of the stirrer in the mixing and discharging part, and the recommencement of the discharge is conducted after the casting part transmits the discharge recommencement preparation completion signal and the rotational speed monitoring element detects that the rotational speed of the stirrer has restored to the rotational speed before the discharge halt;

the above method of casting a plastic lens starting material liquid, wherein the stirring of the plastic lens starting material liquid is carried out by rotating a stirrer comprised in the mixing and discharging part;

the above method of casting a plastic lens starting material liquid, wherein the plastic lens starting material liquid is comprised of the following component (A) and component (B);

Component (A): isocyanate terminal prepolymer in the form of a reaction product of an aliphatic diisocyanate having an intramolecular cyclic structure and a diol having an average molecular weight of 300-2,500.

Component (B): one or more aromatic diamines denoted by general formula (I). (In general formula (I), $R_1$, $R_2$ and $R_3$ are each independently any of a methyl group, ethyl group or thiomethyl group.)

[Chem.1]

General formula (I)

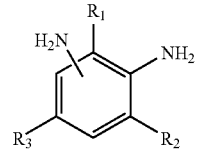

the above method of casting a plastic lens starting material liquid, wherein the plastic lens starting material liquid is an eyeglass lens starting material liquid.

The present invention further provides the following plastic lens starting material liquid casting apparatus.

A plastic lens starting material liquid casting apparatus comprising a mixing and discharging part, a casting part, and a signal processing means conducting generation of a signal transmitted to the mixing and discharging part and transmission of the signal to the mixing and discharging signal, wherein the mixing and discharging part comprises a stirring means stirring a plastic lens starting material in the mixing and discharging part, and comprises a function discharging the plastic lens starting material liquid mixed by the stirring means from the mixing and discharging part and a discharge halt recommencement function halting and recommencing the discharge by reception of a signal, and at least during a period when the plastic lens starting material liquid is discharged from the mixing and discharging part, continuously conducting supply of the plastic lens starting material liquid to the mixing and discharging part, mixing the supplied plastic lens starting material liquid in the mixing and discharging part, and discharging the mixed plastic lens starting material liquid from the mixing and discharging part, and during the discharge halt, the stirring means continues stirring, the casting part casts the plastic lens starting material liquid sequentially into multiple casting molds by conducting conveying the casting mold to a casting position, casting the plastic lens starting material liquid discharged from a mixing apparatus into the casting mold conveyed to the casting position, and conveying the casting mold into which the plastic lens starting material liquid has been cast away from the casting position repeatedly multiple times, and comprises a discharge halt preparation completion signal transmission function and a discharge recommencement preparation completion signal transmission function, the signal processing means comprises a discharge halt signal transmission function receiving the discharge halt preparation completion signal transmitted by the casting part, generating a discharge halt signal based on the signal, and transmitting the discharge halt signal generated to the mixing and discharging part, a discharge recommencement signal transmission function receiving the discharge recommencement preparation completion signal transmitted by the casting part, generating a discharge recommencement signal based on the signal, and transmitting the discharge recommencement signal generated to the mixing and discharging part, and a forced discharge start signal transmission function generating a forced discharge start signal upon detection of elapsing a predetermined time following halting of the discharge or following reception of a discharge halt preparation completion signal of the mixing and discharging part and transmitting the signal to the mixing and discharging part.

One embodiment of the present invention provides:

the above plastic lens starting material liquid casting apparatus, wherein the discharge halt recommencement function of the mixing and discharging part halts the discharge based on the discharge halt preparation completion signal transmitted by the casting part, and recommences based on the discharge recommencement preparation completion signal transmitted by the casting part or the forced discharge start signal transmitted by the signal processing means;

the above plastic lens starting material liquid casting apparatus, wherein the signal processing means comprises a discharge halt time measuring element that measures a time that has elapsed following the halting of discharge of the mixing and discharging part or the reception of a discharge halt preparation completion signal and a storage element that stores the predetermined time, and generates the forced discharge start signal upon elapsing of the predetermined time stored in the storage element without reception of a discharge recommencement preparation completion signal transmitted by the casting part;

the above plastic lens starting material liquid casting apparatus, wherein the mixing and discharging part comprises a stirrer stirring a plastic lens starting material liquid, the signal processing means comprises a rotational speed monitoring element obtaining information of a rotational speed of the stirrer in the mixing and discharging part, generates a signal by detection by the rotational speed monitoring element of attainment of the rotational speed of the stirrer to a predetermined speed, and transmits the signal to the mixing and discharging part;

the above plastic lens starting material liquid casting apparatus, wherein the signal processing means transmits a rotational speed changing signal to the mixing and discharging part, and the mixing and discharging part changes the rotational speed of the stirrer by reception of the rotational speed changing signal;

the above plastic lens starting material liquid casting apparatus, wherein the rotational speed changing signal is generated by the signal processing means based on a signal transmitted by the casting part to the signal processing means.

The present invention further provides a method of casting a plastic lens starting material liquid sequentially into multiple casting molds using the plastic lens starting material liquid casting apparatus of the present invention.

The present invention further relates to a method of manufacturing a plastic lens by casting a plastic lens starting material liquid into a casting mold by the method of casting a plastic lens starting material liquid of the present invention and polymerizing the plastic lens starting material liquid in the casting mold to obtain a molded article.

The present invention can provide a plastic lens affording good optical characteristics from a plastic starting material liquid of high viscosity having a rapid initial polymerization rate, especially from a isocyanate terminal prepolymer component (A) and an aromatic diamine component (B), while decreasing the amount of wasted starting material liquid.

BEST MODE FOR CARRYING OUT THE INVENTION

The method of casting a plastic lens starting material liquid of the present invention is a method of casting a plastic lens starting material liquid using a casting apparatus comprising at least a mixing and discharging part and a casting part, comprising mixing a plastic lens starting material liquid by stirring in the mixing and discharging part and discharging the mixed plastic lens starting material liquid from the mixing and discharging part, and, at least during a period when the plastic lens starting material liquid is discharged from the mixing and discharging part, continuously conducting supply of the plastic lens starting material liquid to the mixing and discharging part, mixing the supplied plastic lens starting material liquid in the mixing and discharging part, and discharging the mixed plastic lens starting material liquid from the mixing and discharging part, and, in the casting part, casting the plastic lens starting material liquid sequentially into multiple casting molds by conducting conveying the casting mold to a casting position, casting the plastic lens starting material liquid discharged from the mixing and discharging part into the casting mold conveyed to the casting position, and conveying the casting mold into which the plastic lens starting material liquid has been cast away from the casting position repeatedly multiple times. In addition, the discharge of the plastic lens starting material liquid from the mixing and discharging part is halted based on a discharge halt preparation completion signal transmitted by the casting part, the discharge that has been halted is recommenced (1) at least based on a discharge recommencement preparation completion signal transmitted by the casting part or (2) by reception by the mixing and discharging part of a forced discharge start signal transmitted upon elapsing a predetermined time following halting of the discharge or following reception of the discharge halt preparation completion signal without transmission of a discharge recommencement preparation completion signal by the casting part, and the stirring in the mixing and discharging part is continued during the period when the discharge is halted.

The method of casting a plastic lens starting material liquid of the present invention (also referred to as "casting method", hereinafter) will be described below.

Casting Apparatus

Figure 2:
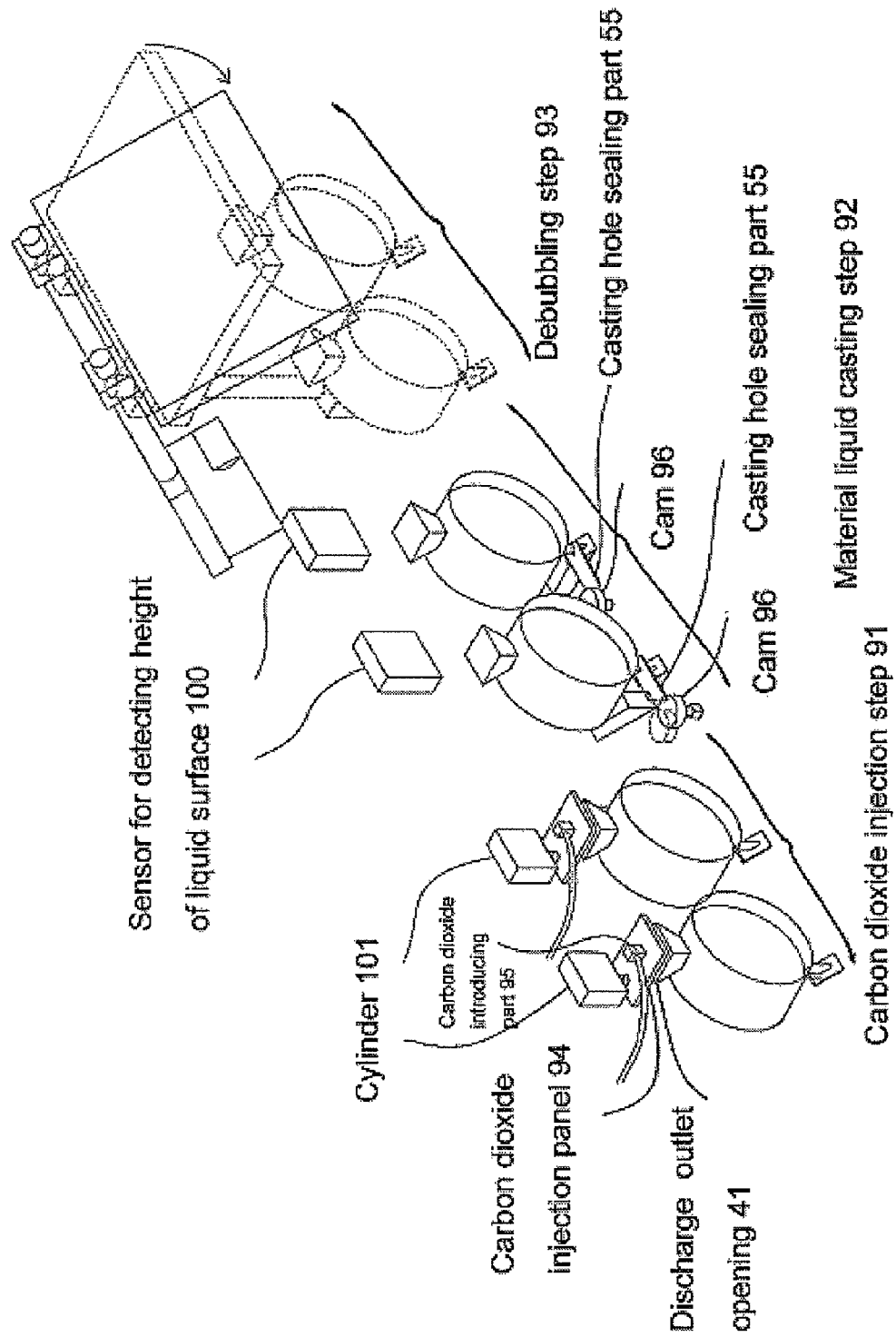

In the casting method of the present invention, a casting apparatus is employed that comprises at least a mixing and discharging part and a casting part. FIG. 1 shows a drawing describing part of a casting apparatus that can be employed in the casting method of the present invention. FIG. 2 is a detailed drawing of the filling part 82 shown in FIG. 1.

In the casting method of the present invention, in the casting part of a casting apparatus, the plastic lens starting material liquid is cast sequentially into multiple casting molds by conducting conveying the casting mold to a casting position, casting the plastic lens starting material liquid discharged from the mixing apparatus into the casting mold conveyed to the casting position, and conveying the casting mold into which the plastic lens starting material liquid has been cast away from the casting position repeatedly multiple times. This process will be described based on the drawings.

Figure 3:
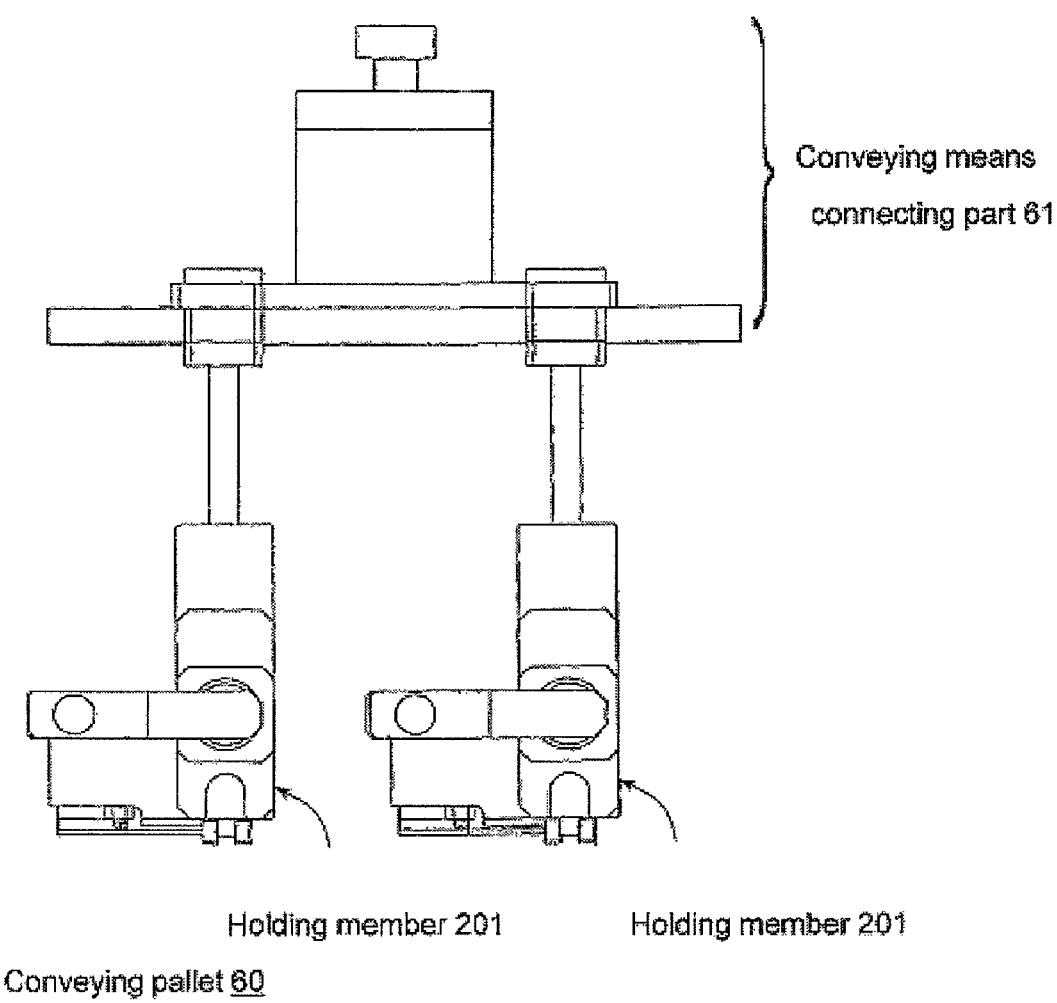
Figure 4:
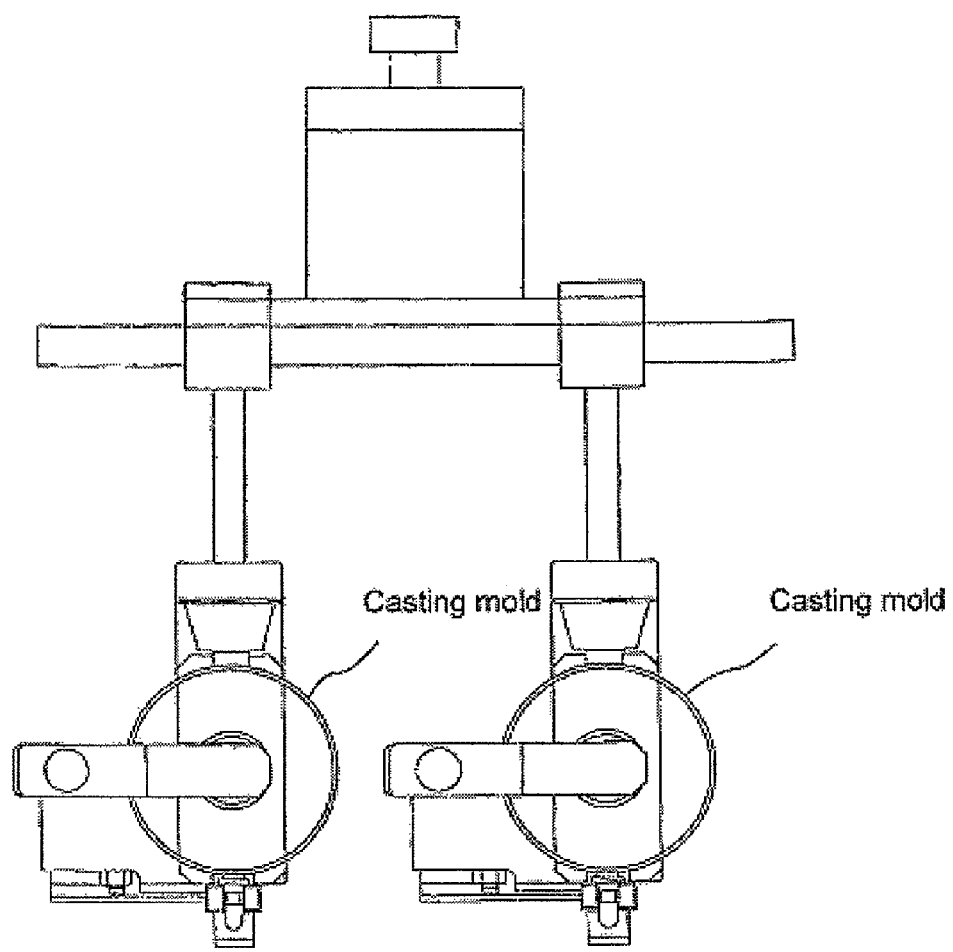

In the automatic casting apparatus shown in FIG. 1, a conveying pallet is first installed on the casting mold mounting part 81 shown in FIG. 1. FIG. 3 shows an example of a conveying pallet (conveying pallet 60). FIG. 4 shows the state (conveying pallet 70) once casting molds have been mounted on the conveying pallets shown in FIG. 3. The casting molds can be mounted manually or automatically.

The casting molds are desirably heated prior to being mounted on the conveying pallets. When the temperature of the casting mold is excessively low relative to the temperature of the starting material liquid when casting a plastic lens starting material liquid, particularly a mixed liquid of components (A) and (B), into the casting molds, a thin film of air forms on the surface of the mold as the starting material liquid moves across the surface of the mold, causing bubble defects. By contrast, when the casting mold is heated prior to casting of the mixed liquid, wettability increases and there is improvement with respect to the above problems. The temperature of the casting mold just before casting of the starting material liquid is desirably a temperature close to, or higher than, the temperature during casting of the starting material liquid from the perspective of enhancement of wettability. Specifically, it is suitable to place the casting mold within an electric furnace or far infrared furnace and heat it to a prescribed temperature, remove it from the furnace, and then cast the mixed liquid into the mold.

Next, conveying pallet 70 is moved by a conveying device such as a free flow conveyor to filling part 82. Filling part 82 conducts at least the step of casting starting material liquid into the casting mold, and desirably performs the three steps described below. These steps will be described based on FIG. 2.

In filling part 82 of FIG. 1, as shown in FIG. 2, three steps are preferably performed. First is a carbon dioxide injection step 91. Second is a mixture casting step 92 in which a mixture is cast using, for example, a casting jig one end of which is connected to a discharge outlet provided in the mixing chamber of a reaction injection molding machine and on the other end of which is mounted a casting nozzle 30. Third is a debubbling step 93 in which the casting mold is tilted to a prescribed angle and maintained for a prescribed period to remove bubbles from within the cavity by means of the buoyancy of the bubbles.

In carbon dioxide injection step 91, when conveying pallet 70 arrives, carbon dioxide injection panel 94 is lowered with a cylinder 101, covering discharge outlet opening 41 of the casting mold. Next, carbon dioxide is introduced into the casting mold with carbon dioxide introducing part 95. The quantity of carbon dioxide introduced is adjusted to the volume of the cavity in the casting mold. The introduction of carbon dioxide is desirably conducted until the casting into the casting mold that is conducted in casting step 92, which is the next step, has been completed. The solubility of carbon dioxide in components (A) and (B) described below is much higher than air. Thus, in the case where the interior of the cavity is filled with carbon dioxide, even when bubbles form within the cavity during mixture casting, the bubbles can be eliminated by dissolution of carbon dioxide into the mixture because they are of carbon dioxide. Thus, the cavity of the casting mold is desirably filled with carbon dioxide prior to casting the mixed liquid. In the embodiment shown in FIG. 2, introduction of carbon dioxide into cavity 4 of casting mold 3 can be conducted by filling it with heated carbon dioxide. The use of heated carbon dioxide to fill the cavity is desirable because the heated casting mold does not end up cooling during the introduction of carbon dioxide. As examples of methods of filling with heated carbon dioxide, a heater can be provided along the flow route of the carbon dioxide to heat it, or the interior of the furnace used to heat the casting mold can be backfilled with carbon dioxide. It is also possible to seal off the casting inlet part and discharge outlet part of the casting mold after it has been filled with carbon dioxide, and then heat the casting mold.

Figure 6:
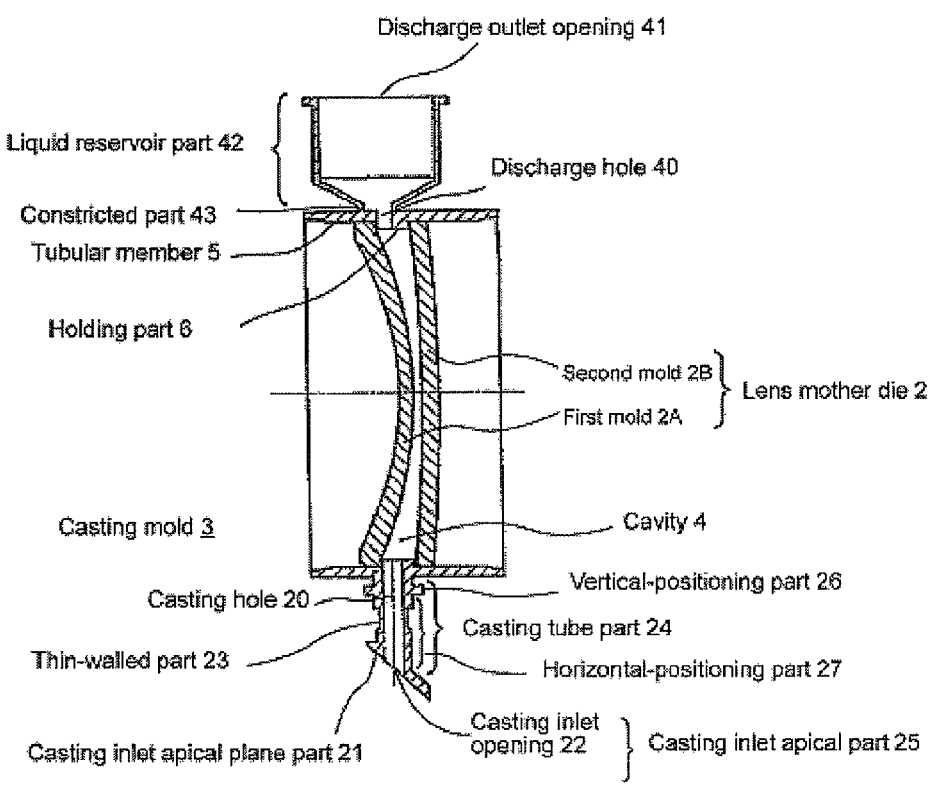
Figure 11:
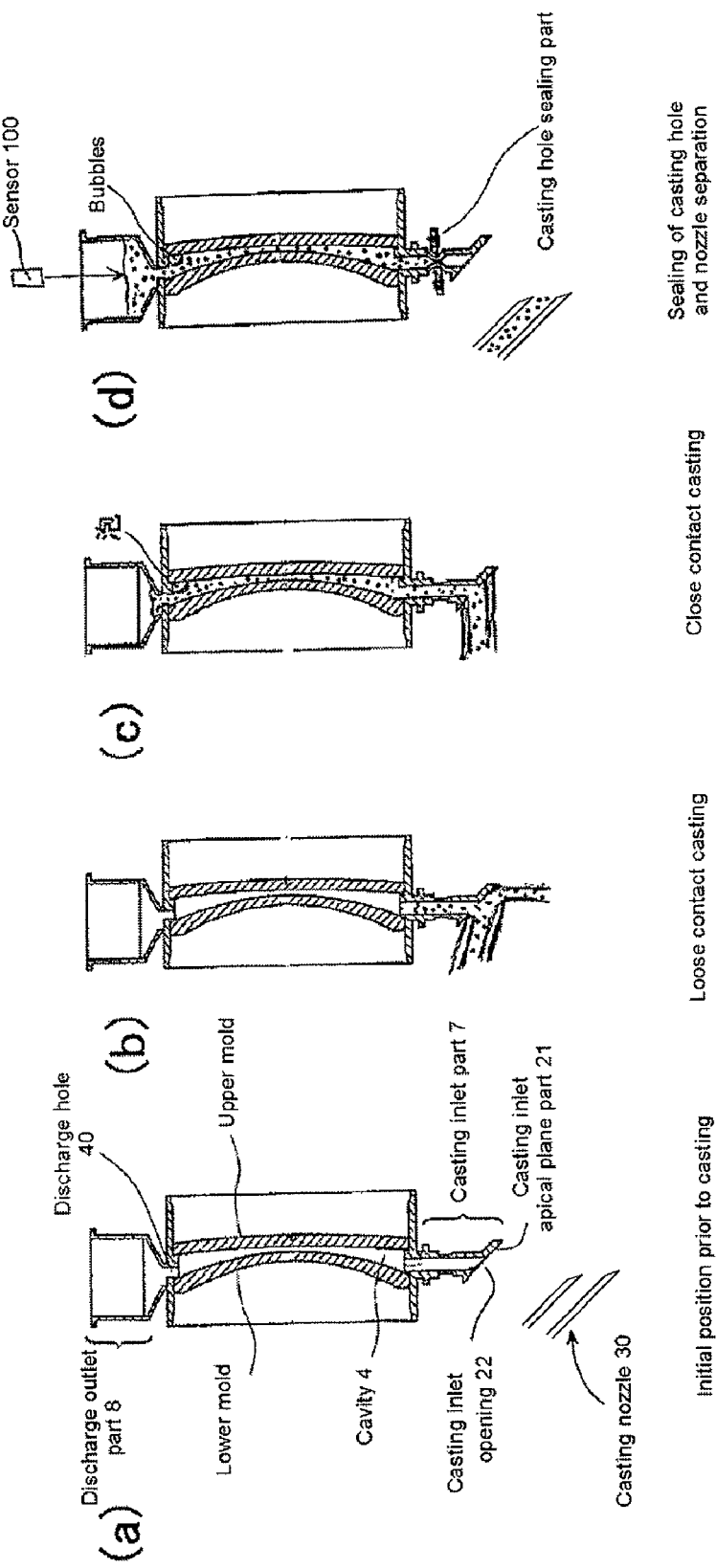

In the embodiment shown in FIG. 2, in casting step 92, a holding member is positioned following the arrival of a conveying pallet 70, and the nozzle hole of a casting nozzle connected through a tube to the discharge outlet provided in the mixing chamber of a reaction injection molding machine is connected over an operating track such as that shown in FIG. 11 to casting hole 20 (see FIG. 6). For the details of positioning and holding the casting mold, Japanese Unexamined Patent Publication (KOKAI) No. 2006-0205710 can be referred, for example.

In the embodiment shown in FIG. 2, following the casting step, conveying pallet 70 is moved to debubbling step 93. When bubbles are generated within casting mold cavity 4 during casting, it is desirable to remove bubbles generated within the cavity. When employing a casting mold having a discharge hole at the top of the cavity such as is shown in FIG. 6, the bubbles can be removed through the discharge hole. In this case, removal of bubbles can be conducted by tilting the casting mold to a prescribed angle at which the discharge hole is at the top and maintaining it there for a prescribed period. The angle and the period are suitably set based on the item. However, depending on the type of plastic lens being manufactured, there are cases where no debubbling step is necessary. The casting mold may be tilted to just one side, or may be tilted to different sides in alternating fashion. The tilting method may be suitably set based on the position of the cavity side opening of the discharge hole. For example, when the cavity side opening of the discharge hole is placed closer to the upper mold (second mold in FIG. 6) or lower mold (first mold in FIG. 6), tilting can be conducted to position that side at the top. Specifically, when placed in proximity to the upper mold, tilting is desirably conducted so that the upper mold is on top. When placed in proximity to the lower mold, tilting is desirably conducted so that the lower mold is on top. When the cavity side opening of the discharge hole is positioned in the middle, it is preferable to tilt to both sides. Polymerization of the mixed liquid progresses even during tilting, with the viscosity gradually increasing. By moving the casting mold during polymerization, the polymerizing resin flows, running the risk of creating optical defects. Thus, tilting is desirably conducted to just one side and maintained for a prescribed period. In the gasket shown in FIG. 6, the cavity side opening of the discharge hole is positioned closer to the lower mold for the above-stated reasons. Thus, tilting can be conducted to bring the lower mold to the top, and, for example, maintained for about 10 to 15 seconds to remove bubbles.

In the debubbling step 93 in the embodiment shown in FIG. 2, simultaneously with completion of positioning of the pallet, both the casting mold and conveying pallet 70 are tilted to a prescribed angle by an air cylinder and maintained there for a prescribed period with the discharge hole at the top to conduct debubbling. As stated above, this angle and period can be suitably set based on the item, and there are cases in which no debubbling step is required, depending on the type of plastic lens being manufactured.

After conducting a debubbling step as needed, the casting mold is preferably left in a state where the discharge hole is on top and the mixture is preferably caused to polymerize further. For example, when employing the casting mold shown in FIG. 6, in this casting mold leaving step, discharge hole is positioned on top, the casting mold is maintained so that the mixture does not overflow, the casting mold is left in a calm location for a prescribed period of time in a low-temperature atmosphere, and polymerization is conducted. Subsequently, before polymerization has progressed to the end, the polymerized portion in casting hole 20 and the polymerized portion in discharge hole 40 are broken. Thus, the formed lens article part that has polymerized in cavity 4 and the parts that have polymerized within casting hole 20 and discharge hole 40 are severed. Next, the casting mold is desirably positioned in a high-temperature atmosphere and polymerization is desirably allowed to further proceed. Before leaving in a high-temperature atmosphere, the polymerized portion in the casting hole and the polymerized portion in the discharge hole are broken to facilitate removal of the gasket following leaving in the high-temperature atmosphere.

The above low-temperature atmosphere is a relatively low-temperature atmosphere under which polymerization proceeds through self-generated heat. For example, it may be from −10 to 50° C. During leaving in the low-temperature atmosphere, the mixture self-generates heat through an exothermic polymerization reaction, further promoting polymerization. When polymerization reaches a certain degree, the level of heat generated drops, and the polymerization reaction gradually winds down. When left continuously in this state, polymerization contraction increases as the polymerization reaction progresses. Internal distortion grows and there is a risk of the molded lens article cracking and separating from the mold. Thus, the time of leaving in the low-temperature atmosphere is suitably set to be long enough for polymerization to proceed to a degree permitting severing of the portions polymerizing within casting hole 20 and discharge hole 40 from the portion polymerizing in the cavity, and less than the time required for internal distortion due to polymerization contraction to increase and hinder molding. For example, the leaving time desirably falls within a range of 5 to 20 minutes.

During leaving in the low-temperature atmosphere, particularly prior to conducting the severing operation, it is desirable to rock the gasket as little as possible. This prevents the mixture from flowing in the cavity during polymerization, thus reducing optical defects in the molded lens article.

In polymerization with self-generated heat in a low-temperature atmosphere, curing takes place without complete polymerization and with functional groups remaining, so the final molded article is not of great strength. Thus, in the case of using the casting mold shown in FIG. 6, during leaving in a low-temperature atmosphere, the polymerized portions in casting hole 20 and discharge hole 40 can be readily broken off by bending casting tube part 24 and constricted part 43. With the gasket made of elastic resin, they can be bended by bending casting inlet part 7 and discharge outlet part 8. Thus, the severing operation is readily conducted.

After conducting the above-described severing operation, the step of leaving in a high-temperature atmosphere can be conducted by leaving the casting mold in a furnace that has been preheated to a prescribed temperature to prepare a high-temperature atmosphere. Leaving in a high-temperature atmosphere alleviates internal distortion in the molded article and advances the reaction of functional groups that do not react in the polymerization conducted in the above low-temperature atmosphere. Upon completion of polymerization, the temperature is gradually decreased and the casting mold is removed from the furnace. Heating in the high-temperature atmosphere can be conducted for about 15 to 24 hours at from 110 to 150° C., for example. Once the casting mold has been removed from the furnace, the gasket is first removed, after which the first and second molds are removed. The molded plastic lens article is then finished.

In the automatic casting apparatus shown in FIG. 1, following the debubbling step, the air cylinder is lowered to return conveying pallet 70 to its original position, after which conveying pallet 70 is moved to the U-turn conveying areas 83 to 85 shown in FIG. 1. In U-turn conveying areas 83 to 85, the direction of advance of conveying pallet 70 is changed, after which conveying pallet 70 is moved to removal waiting area 86. Subsequently, in removal waiting area 86, conveying pallet 70 is left standing for a prescribed period in a low-temperature atmosphere.

After the prescribed time has elapsed, conveying pallet 70 is moved to U-turn removal area 87. The direction of advance of conveying pallet 70 is changed in U-turn removal areas 87 to 89. In removal waiting area 86, for example, an escaper is positioned at a prescribed point on the free flow conveyor so that after the prescribed time has elapsed, the time required for the conveyor pallet to reach U-turn removal area 87 can be controlled. In U-turn removal area 88, the casting mold is removed from conveying pallet 70. The casting mold may be removed manually or automatically.

Subsequently, the conveying pallet is transferred, through U-turn removal area 89, to casting mold mounting part 81, a new casting mold is mounted, and mixture is cast. In the above-described steps, the casting mold that has been filled with mixture is desirably gently conveyed to prevent flowing of the mixture.

Subsequently, on the casting mold that has been removed from conveying pallet 70, constricted part 43 of the gasket and casting tube part 24 (see FIG. 6) are bent to sever and break the resin that has filled and cured in the discharge hole and casting hole. Subsequently, the casting mold is placed in a high-temperature atmosphere and left standing for a prescribed period. This placement step is as described above.

Reference can be made to Japanese Unexamined Patent Publication (KOKAI) Nos. 2004-291606, 2006-205710, and 2006-231600 for details relating to the above-described casting step.

Mixing of the Plastic Lens Starting Material Liquid

Mixing of the starting material liquid in the casting apparatus will be described next.

A mixed liquid of multiple polymerizable components can be employed as the plastic lens starting material liquid that is cast into the casting mold by the casting method of the present invention. The plastic lens starting material liquid is mixed in the discharge mixing part of the casting apparatus prior to casting into the casting mold. In the mixing of the starting material liquid, a uniform mixture of two liquids can be obtained employing a rapidly rotating shaft or a static mixer. In particular, a reaction injection molding ("RIM" hereinafter) machine is desirably employed to mix components (A) and (B), descried further below.

Figure 7:
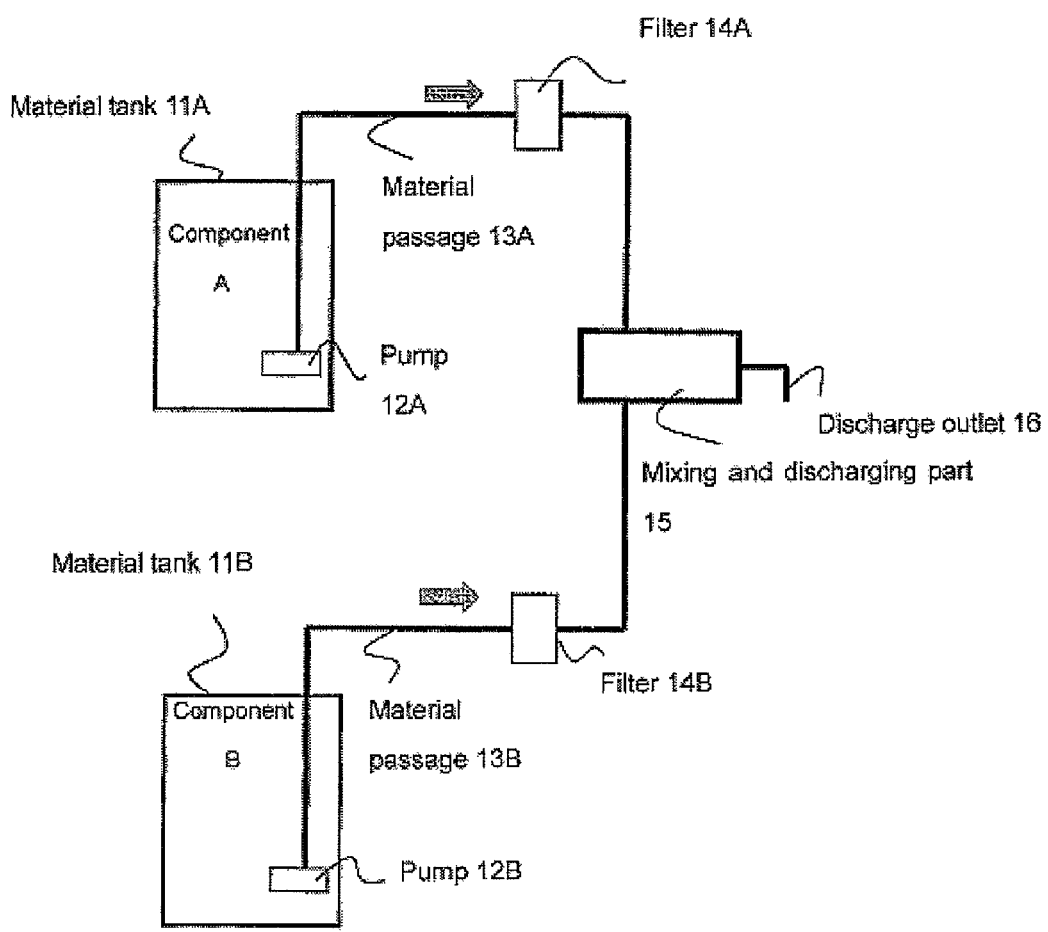
Figure 8:
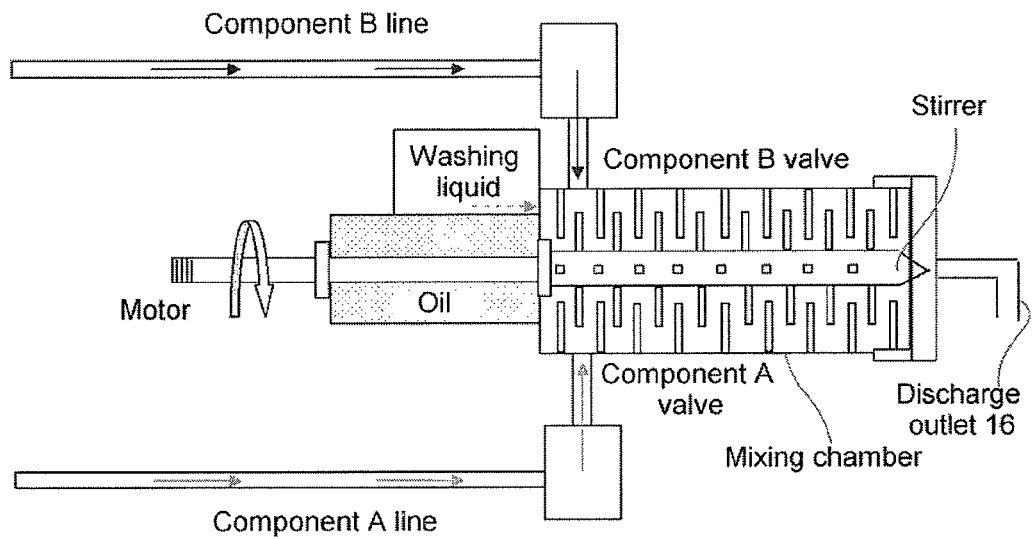

The configuration and operation of a RIM will be described based on FIGS. 7 and 8, taking mixing of components (A) and (B) described further below as an example. FIG. 7 is a drawing describing the structure of a RIM machine and FIG. 8 is a descriptive diagram showing the structure of the mixing and discharging part of a RIM machine.

The RIM machine is comprised of material tank 11A storing component (A); material tank 11B storing component (B); mixing and discharging part 15 mixing and discharging components (A) and (B); material flow passage 13A connecting material tank 11A with mixing and discharging part 15; and material flow passage 13B connecting material tank 11B with mixing and discharging part 15. In the middle of material flow passages 13A and 13B, filters 14A and 14B are respectively provided for filtration of foreign matter in these components. A rotating shaft rotating at high speed or a static mixer is provided in mixing and discharging part 15 to mix components (A) and (B) arriving over material flow passages 13A and 13B. The starting material liquid is desirably stirred by a rotating shaft, equipped with stirrer, that is driven by the rotation of a motor as shown in FIG. 8.

Components (A) and (B) are held at a reduced pressure in their respective material tanks mentioned above, adequately degassed, and maintained at a prescribed temperature. When degassing is inadequate, bubbles sometimes enter the molded article, compromising the properties and external appearance of the finished product and tending to reduce the mechanical strength of the molded article. Once they have been adequately degassed and rendered uniform in temperature, the respective components are forced by pumps 12A and 12B from material tanks 11A and 11B over material flow passages 13A and 13B and through filters 14A and 14B into mixing and discharging part 15. The mixture that has been rapidly and uniformly mixed in mixing and discharging part 15 is discharged through discharge outlet 16. The discharging of the mixed liquid will be described in detail further below.

A RIM machine is usually provided with pump 12A, pump 12B, and a control part that is not illustrated in Figures, but controls a motor for rotating stirrer and the like and monitors the operation thereof. The control part controls supply of the starting material liquid to the mixing and discharging part, mixing the starting material liquid in the mixing and discharging part, and discharging the starting material liquid from the mixing and discharging part. The operation described below as that of the mixing and discharging part can also be done through the above-described control part.

Heating component (A) to lower the viscosity thereof before mixing components (A) and (B), described further below, is desirable from the perspective of avoiding defects due to bubbles. Since component (A) is generally of high viscosity, heating it to less than or equal to 8,000 CPS to impart a certain degree of fluidity before mixing with component (B) is desirable from the perspective of facilitating mixing with component (B). At or below this viscosity, bubbles are readily removed prior to mixing when employing an RIM, described further below. The component (A) is desirably heated to a temperature at which the viscosity is 6,000 CPS or less, preferably 4,000 CPS or less.

Discharging of Plastic Lens Starting Material Liquid

In the mixing and discharging part, at least during a period when the plastic lens starting material liquid is discharged, supply of the plastic lens starting material liquid to the mixing part, mixing the supplied plastic lens starting material liquid, and discharging the mixed plastic lens starting material liquid from the mixing part are continuously conducted.

In the present invention, the description, continuously conducting the above supply, mixing, and discharging during a period when the plastic lens starting material liquid is discharged from the mixing and discharging part, means continuously conducting the supply, mixing, and discharging without halting during the above period, preferably means simultaneously conducting the supply, mixing, and discharging in parallel.

As set forth above, in the conventional method, when the plastic lens starting material liquid is highly viscous and has a rapid initial polymerization rate, halting of discharging creates problems by causing optical defects in lenses obtained after recommencement of discharging and by making it difficult to recommence discharging once it has been halted. On the other hand, when discharging is continued after the starting of casting to avoid the above problems, a large amount of starting material liquid is not cast into the casting mold, which is undesirable from the perspective of the efficient use of the starting material.

By contrast, in the casting method of the present invention, a period is provided during which the discharging of starting material liquid by the mixing and discharging part is temporarily halted. However, the stirring of the mixed liquid is continued in preparation for the recommencement of discharging, even while discharging is halted. Furthermore, discharging of the plastic lens starting material liquid from the mixing and discharging part is halted based on a discharge halt preparation completion signal transmitted by the casting part. Then, the discharge that has been halted is recommenced (1) at least based on a discharge recommencement preparation completion signal transmitted by the casting part or (2) by reception by the mixing and discharging part of a forced discharge start signal transmitted upon elapsing a predetermined time following halting of the discharge or following reception of the discharge halt preparation completion signal without transmission of a discharge recommencement preparation completion signal by the casting part. When a discharge preparation completion signal is not transmitted by the casting part because of the occurrence of a trouble such as a delay in the mounting of a casting mold on a conveying pallet or improper operation of the free flow conveyor, there is a risk that while waiting for the signal, polymerization of the starting material liquid in the mixing and discharging part will progress excessively, causing optical defects in lenses obtained following the recommencement of discharging or making it difficult to recommence discharging. By contrast, these problems can be avoided by forced recommencement of discharging after the elapsing of a prescribed period. Controlling the discharging of plastic lens starting material liquid by the mixing and discharging part based on a signal from the plastic lens starting material liquid casting part in this manner can provide a plastic lens with good optical characteristics while decreasing the amount of starting material liquid that is wasted.

In the casting apparatus, signals may be generated, transmitted, and received directly between the casting part and the mixing and discharging part, or signals may be transmitted from the casting part to the mixing and discharging part through a signal processing means that generates signals transmitted to the mixing and discharging part and transmits these signals to the mixing and discharging part. Further, the signal processing means desirably comprises a discharge halt time measuring element that measures the time that has elapsed following the halting of discharge or the reception of a discharge halt preparation completion signal, and a storage element that stores the above-mentioned predetermined time. A specific example of a signal processing means is a personal computer in which a signal processing program has been loaded.

The signal processing means can be built into a control part on the RIM machine side or a control part on the casting part, or can be provided separately from them.

The halting and recommencement of discharging based on a signal in the present invention includes not just the halting and recommencement of discharging by the reception of the signal, but also includes the halting and recommencement of discharging based on (for example. by the reception of) a signal generated on the basis of this signal.

As for the halting of the discharge, the mixing and discharging part can halt discharging by the reception of a discharge halt preparation completion signal or can halt discharging by the reception of a discharge halt signal generated based on a discharge halt preparation completion signal. The discharge halt signal can be generated by the mixing and discharging part or generated by the signal processing means that has received a discharge halt preparation completion signal.

As for the recommencement of the discharge, when recommencing discharging under (1) above, the mixing and discharging part can recommence discharging by the reception of a discharge recommencement preparation completion signal, or can recommence discharging by the reception of a discharge recommencement signal generated based on a discharge recommencement preparation completion signal. The discharge recommencement signal can be generated by the mixing and discharging part or by a signal processing means that has received a discharge recommencement preparation completion signal. When recommencing discharging under (2) above, discharging can be recommenced by the reception by the mixing and discharging part of a forced discharge start signal transmitted by the signal processing means upon elapsing of a predetermined period of time stored in the storage element without the reception of a discharge recommencement signal transmitted by the casting part.

Signal transmission, reception, and the like will be described in detail for each embodiment of stirring in the mixing and discharging part while discharging has been halted. Numerical values such as the rotational speeds and the like given in FIGS. 9, 12, 14, 16, and 18 are merely examples; the present invention is not limited to the embodiments shown in these drawings.

Figure 9:
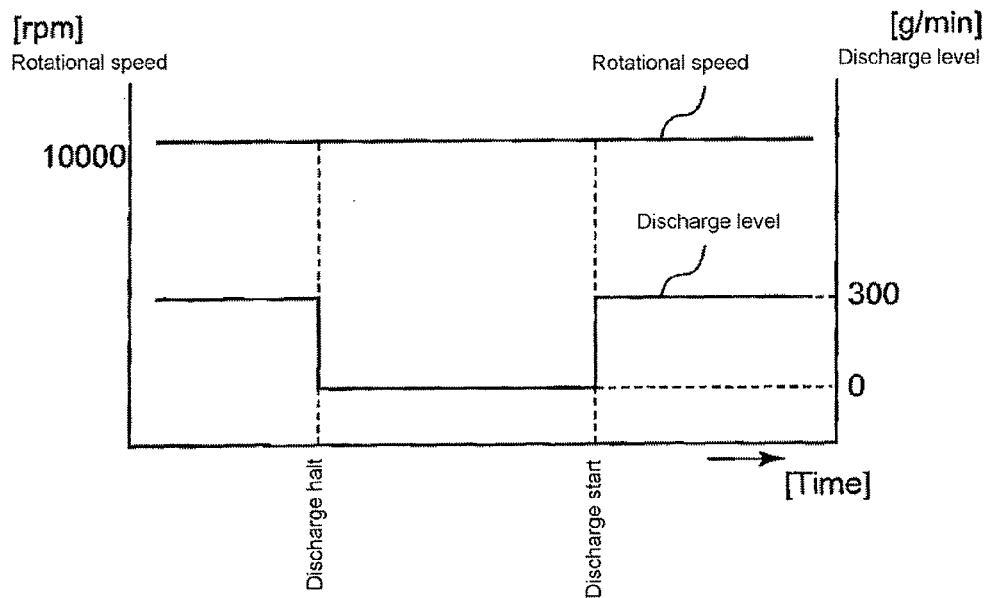

(A) The Case when Rotational Speed is Constant During Discharge Halt (FIG. 9)

Figure 10:
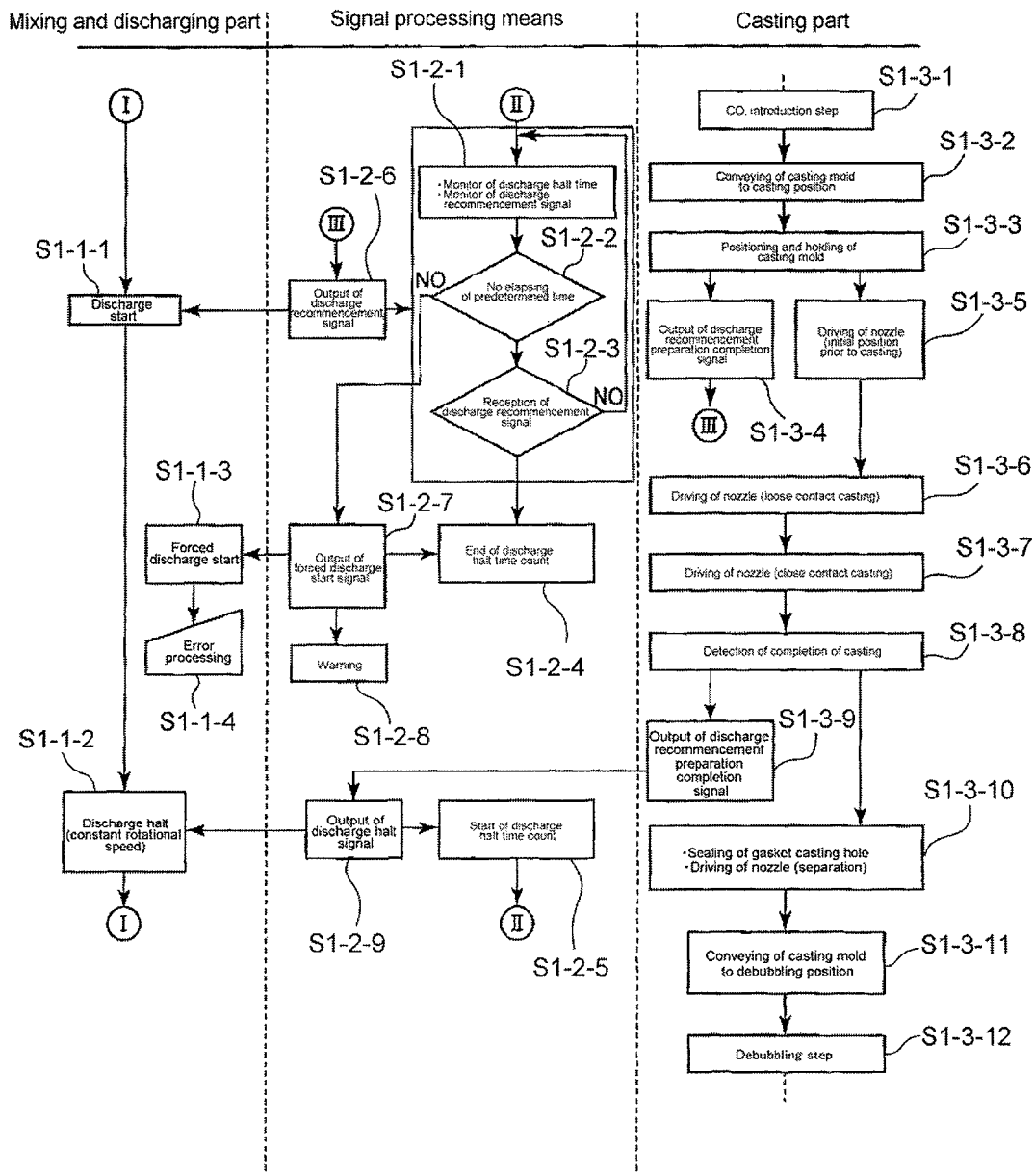

FIG. 9 shows the relation between the rotational speed of the stirrer and the discharge level of the mixing and discharging part when a constant rotational speed of the stirrer is maintained even during discharge halt in the mixing and discharging part. FIG. 10 is a descriptive drawing of signal transmission and reception in the embodiment shown in FIG. 9. Explanations will be given below with reference to FIG. 10.

First, casting of the first casting mold is conducted. For example, the casting part generates and transmits a discharge halt preparation completion signal (S1-3-8, S-1-39) based on detection by the casting part that the liquid level of the plastic lens starting material liquid that is being cast into the casting mold has reached a predetermined position within the casting mold. Either a contact-type or noncontact-type liquid level detecting sensor can be employed. However, the use of a noncontact-type sensor is desirable because the problem of adhesion of starting material liquid to the sensor does not occur. Examples of noncontact-type sensors are: ultrasonic sensors, optical sensors, pressure differential sensors, heat sensors, electrostatic capacitance sensors, and image sensors.

The discharge halt preparation completion signal can be directly received by the mixing and discharging part, but is desirably received by a signal processing means. The signal processing means that receives the discharge halt preparation completion signal generates a discharge halt signal that it transmits to the mixing and discharging part (S1-2-9). In the casting method of the present invention, after halting discharging, a forced discharge recommencement signal is transmitted to the mixing and discharging part, desirably by the signal processing means, upon elapsing of a predetermined period following the halting of discharge or following the reception of the discharge halt preparation completion signal, without transmission of a discharge recommencement preparation completion signal by the casting part. Thus, the occurrence of problems such as those set forth above can be avoided when transmission of the discharge recommencement preparation completion signal delays due to some form of trouble in the casting part. The signal processing means can start measuring the discharge halt time from when a discharge halt preparation completion signal is received as shown in FIG. 10, or can start measuring the discharge halt time when receiving a signal providing notification that discharging has been halted from the mixing and discharging part.

The mixing and discharging part that has received a discharge halt signal from the signal processing means halts discharging starting material liquid from the discharge outlet (S1-1-2). However, in this embodiment, the rotational speed of the stirrer does not change and is maintained constant even during the halting of discharge.

The casting part that has detected the completion of casting of starting material liquid transmits a discharge halt preparation completion signal in the manner set forth above as well as seals the casting hole so that starting material liquid does not flow out of the casting mold into which it has been cast, and drives the casting nozzle to separate the nozzle from the casting hole (S1-3-10, see FIG. 11(d)). This operation is described in detail in Japanese Unexamined Patent Publication (KOKAI) No. 2006-205710, for example. Subsequently, the casting mold into which starting material liquid has been cast is conveyed away from the casting position and the debubbling step and the like are conducted (S1-3-11, S1-3-12). The steps following conveying are as set forth above.

In parallel with the casting of the starting material liquid into the first casting mold, preparation steps are conducted for the casting of starting material liquid into a new casting mold that has been mounted on a conveying pallet. Once carbon dioxide has been optionally introduced into the casting mold into which starting material liquid is being cast, the casting mold is conveyed to the casting position (S1-3-1, S1-3-2). When the casting mold arrives at the casting position, it is positioned and held (S1-3-3). Positioning and holding are described in detail in Japanese Unexamined Patent Publication (KOKAI) No. 2006-205710.

Once positioning and holding of the casting mold have been completed and the casting mold has been placed in the casting position, the casting part generates and transmits a discharge recommencement preparation completion signal (S1-3-4). The discharge recommencement preparation completion signal can be directly received by the mixing and discharging part, but is desirably received by the signal processing means.

When a discharge halt preparation completion signal is received by the signal processing means, as described above, a discharge halt time count is commenced and the discharge halt time and discharge recommencement signals are monitored (S1-2-5, S1-2-1, 2, 3). Within the scope in which discharge recommencement is possible, the discharge halt time that is permitted for obtaining lenses with excellent optical characteristics is desirably set in advance in reviewing a manufacturing condition. The time that is set is desirably stored in a storage element comprised in the signal processing means.

When the signal processing means receives a discharge recommencement preparation completion signal from the casting part before the time stored in the storage element has elapsed, it generates a discharge recommencement signal, transmits it to the mixing and discharging part, and ends the count of the discharge halt time (S1-2-6, S1-2-4). When no discharge recommencement signal that is to be generated by reception of a discharge recommencement preparation completion signal is output even after the time stored in the storage element has elapsed, a forced discharge recommencement signal is generated and transmitted to the mixing and discharging part and the count of the discharge halt time is ended (S1-2-7, S1-2-4). The confirmation of error occurrence is made easy when settings are made for an alarm to go off with the transmission of a forced discharge recommencement signal (S1-2-8).

The mixing and discharging part recommences discharging the starting material liquid from the discharge outlet by reception of a discharge recommencement signal (S1-1-1). Alternatively, forced discharging begins and error processing is conducted when a forced discharge start signal is received (S1-1-3, S1-1-4). Examples of the error processing that is conducted here are operations of removal of starting material liquid and cleaning in the mixing chamber with halting of the feeding of starting material liquid to the mixing and discharging part and halting of the operation of the mixing and discharging part.

In the casting part where positioning and holding of the casting mold have been completed, a discharge recommencement preparation completion signal is transmitted as set forth above and the casting nozzle is driven to position the casting nozzle close to the casting position (the nozzle stands by at the initial position prior to casting) (S1-3-5, see FIG. 11(a)). Subsequently, the nozzle is again driven. When discharging by the mixing and discharging part is recommenced and starting material liquid flows out through the tip of the nozzle, the casting of starting material liquid begins without the nozzle tip and the casting inlet apical plane part being in close contact (loose contact casting) (S1-3-6, see FIG. 11(b)). Subsequently, the nozzle is again driven to bring the nozzle tip into close contact with the casting inlet, and casting is continued (close contact casting) (S1-3-7, see FIG. 11(c)). Although loose contact casting is not necessary, the conducting of loose contact casting is desirable because it permits better contact between the nozzle tip and the casting inlet opening due to wetting of the casting inlet apical plane part 21 with starting material liquid, causing bubbles adhering to casting inlet apical plane part 21 to flow off.

Figure 12:
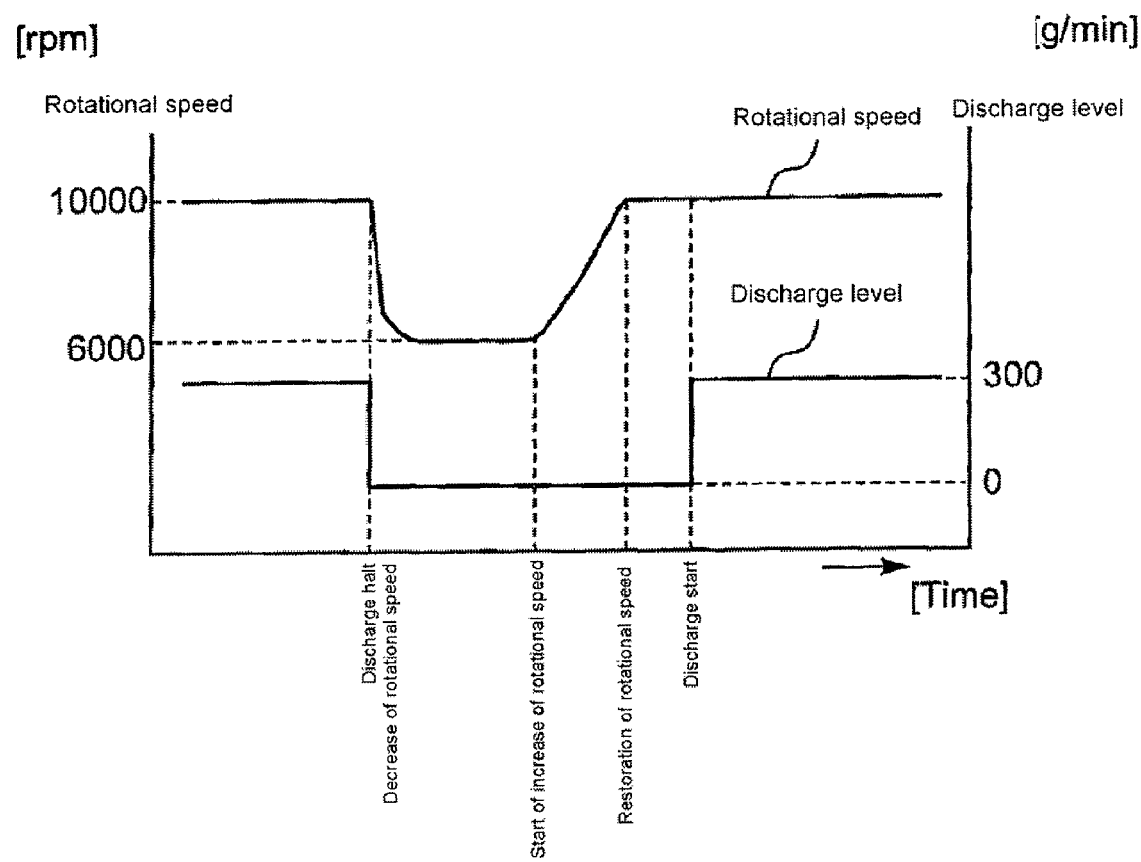

(B) The Case when Rotational Speed Restoration is Confirmed after Changing the Rotational Speed During a Discharge Halt (FIG. 12)

Figure 13:
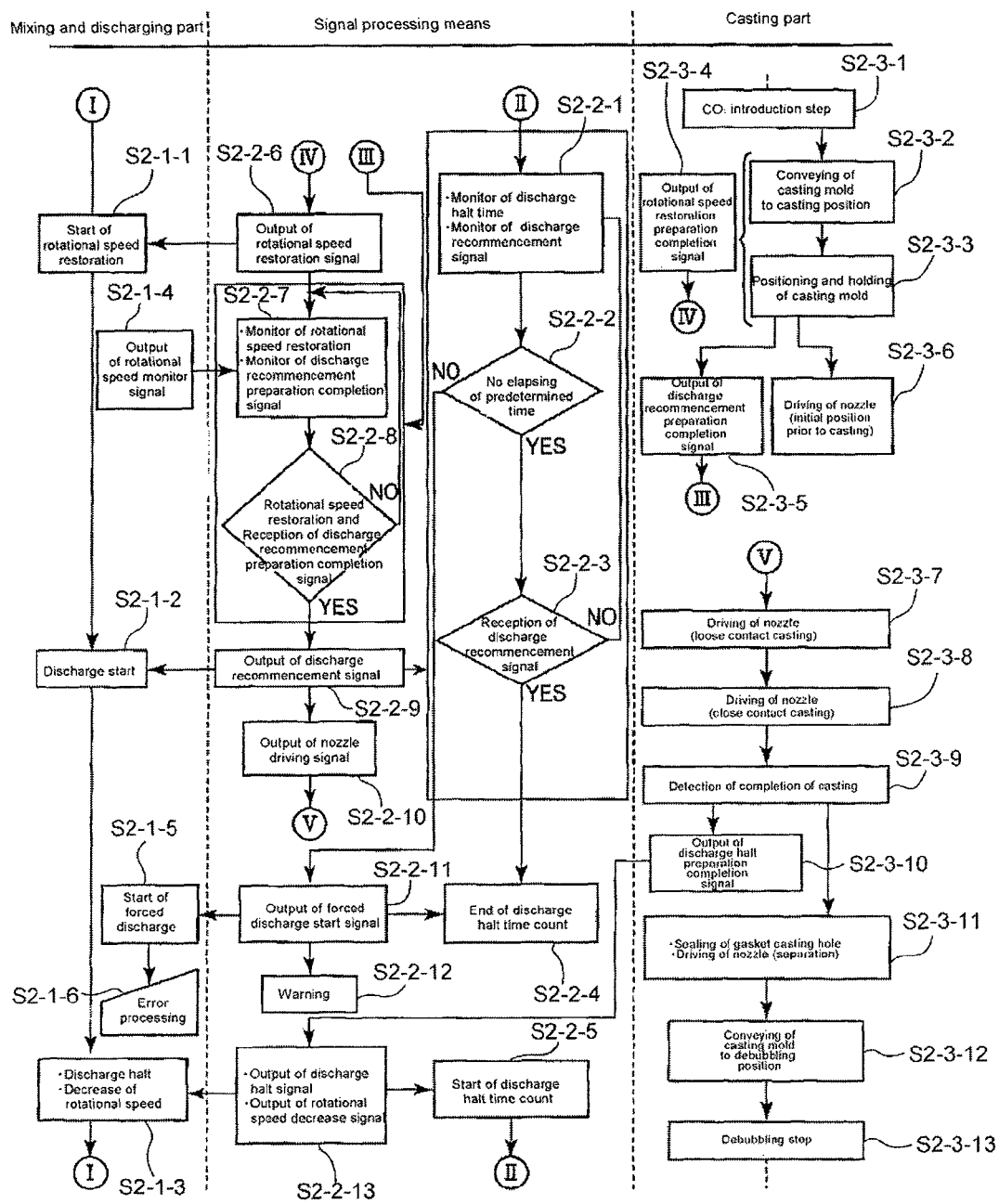

FIG. 12 shows the relation between the rotational speed of the stirrer and the discharge level from the mixing and discharging part when the rotational speed of the stirrer is reduced during a discharge halt, an increase in the rotational speed is begun before recommencement of discharging, and restoration of the rotational speed to the rotational speed before the discharge halt is confirmed prior to recommencing discharge in the mixing and discharging part. FIG. 13 shows a drawing describing the transmission and reception of signals in the embodiment shown in FIG. 12. Explanations will be given below with reference to FIG. 13.

The steps from the introduction of carbon dioxide into the casting mold through to driving the nozzle to move it into the initial position before casting are as set forth based on FIG. 10 (S2-3-1, 2, 3, and S2-3-6).

Further, the steps from loose contact casting of starting material liquid into the casting mold to debubbling, as well as the step of outputting a discharge halt preparation completion signal, are also as described in FIG. 10 (S2-3-7, 8, 9, 10, 11, 12, and 13).

In addition to beginning to count the discharge halt time and conducting monitor of the discharge halt time and the discharge recommencement signal, as set forth above, the signal processing means that has received a discharge halt preparation completion signal also transmits a discharge halt signal and a rotational speed reduction signal to the mixing and discharging part (S2-2-13, S2-2-5, S-2-2-1, 2, 3). The discharge halt signal and rotational speed reduction signal may be a single signal. Reception of the discharge halt preparation completion signal and generation of a discharge halt signal and rotational speed reduction signal may also be conducted in the mixing and discharging part.

The mixing and discharging part that has received a discharge halt signal and rotational speed reduction signal halts the discharging of starting material liquid from the discharge outlet and reduces the rotational speed of the stirrer stirring the starting material liquid. (S2-1-3). The degree to which the rotational speed is reduced can be set based on the polymerization rate of the starting material liquid or the like.

Once positioning and holding of the casting mold have been completed and the casting mold has been placed in the casting position, the casting part generates and transmits a discharge recommencement preparation completion signal (S2-3-3, S2-3-5). The discharge recommencement preparation completion signal can be directly received by the mixing and discharging part, but is desirably received by a signal processing means.

Once the signal processing means has received a discharge halt preparation completion signal, as described above, it begins the discharge halt time count and monitors the discharge halt time and the discharge recommencement signal (S2-2-5, S2-2-1, 2, 3). Within the scope in which discharge recommencement is possible, the discharge halt time that is permitted for obtaining lenses with excellent optical characteristics is desirably set in advance in reviewing a manufacturing condition. The time that is set is desirably stored in a storage element comprised in the signal processing means.

The casting part transmits a rotational speed restoration preparation completion signal at a prescribed stage prior to completion of positioning and holding of the casting mold (S2-3-4). The rotational speed restoration preparation completion signal can be directly received by the mixing and discharging part, but is desirably received by the signal processing means.

The signal processing means that has received the rotational speed restoration preparation completion signal generates a rotational speed restoration signal and transmits it to the mixing and discharging part, monitors restoration of the rotational speed, and monitors the discharge recommencement preparation completion signal (S2-2-6, S2-2-7, 8). Restoration of the rotational speed can be monitored based on the rotational speed information transmitted by the mixing and discharging part. Thus, the mixing and discharging part desirably has the function of monitoring the rotational speed and outputting the information, and the signal processing means desirably comprises a rotational speed monitoring element (S2-1-4).

The mixing and discharging part receives a rotational speed restoration signal, increases the rotational speed of the stirrer, and begins to restore the rotational speed to the rotational speed before halting of the discharge (S2-1-1). The mixing and discharging part transmits to the signal processing means that the rotational speed has been restored to the rotational speed before halting of the discharge, or the signal processing means detects that the rotational speed has been restored. When the signal processing means confirms that the rotational speed has been restored and receives the above discharge recommencement preparation completion signal, it generates a discharge recommencement signal, transmits it to the mixing and discharging part, generates a nozzle drive signal, and transmits it to the casting part (S2-2-9, S2-2-10). Upon receiving the discharge recommencement signal, the mixing and discharging part recommences discharging starting material liquid (2-1-2).

The casting part that has received the nozzle drive signal drives the nozzle and begins loose contact casting (S2-3-7). Subsequently, the casting step is conducted as set forth above.

When the signal processing means has monitored the discharge halt time, monitored the discharge recommencement signal, and confirmed that a discharge recommencement signal has been outputted before the time stored in the storage element elapses, it ends the discharge halt time count (S2-2-1, S2-2-4). When a discharge recommencement signal is not outputted even after the time stored in the storage element has elapsed, a forced discharge start signal is generated and transmitted to the mixing and discharging part and the discharge halt time count is ended (S2-2-11, S2-2-4). It is also possible to devise a warning (S2-2-12). When the mixing and discharging part receives the forced discharge start signal, it begins forced discharging and then conducts the above-described error processing (S2-1-5, S2-1-6). Starting discharge after confirming the restoration of the rotational speed in this manner is desirable from the viewpoint of permitting casting while stirring at the same rotational speed as before the discharge halt.

Figure 14:
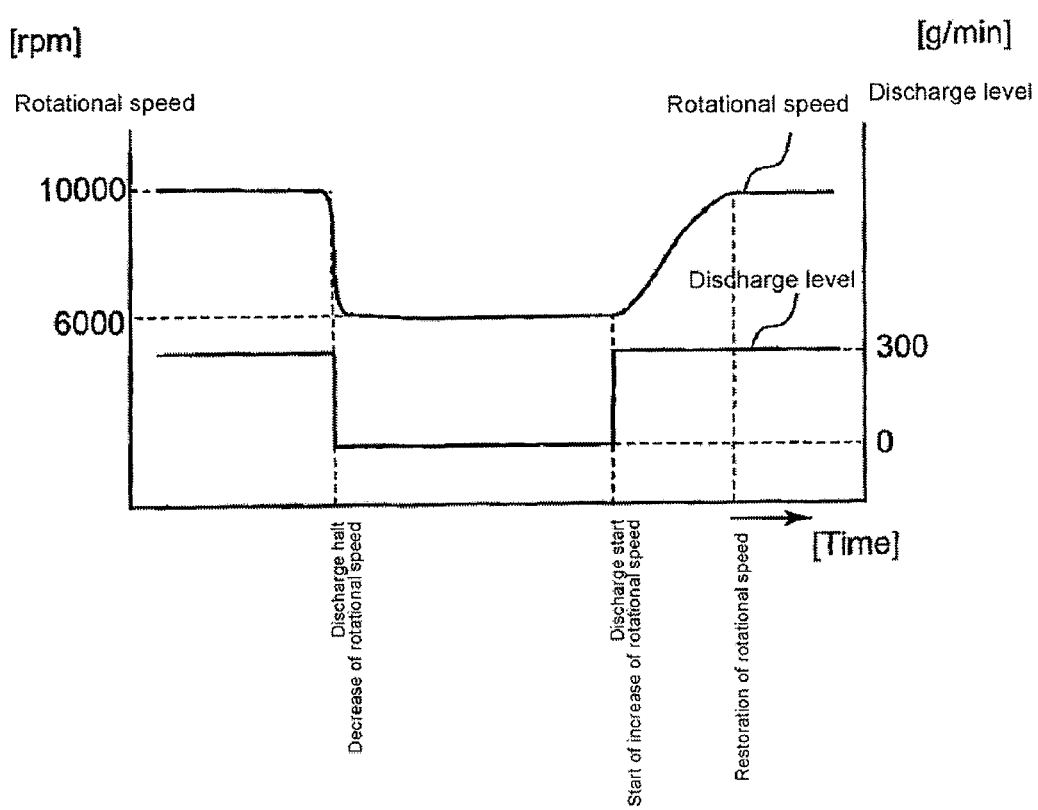

(C) The Case when the Rotational Speed is Changed During a Discharge Halt and an Increase in Rotational Speed is Begun at the Time when Discharging is Recommenced (FIG. 14)

Figure 15:
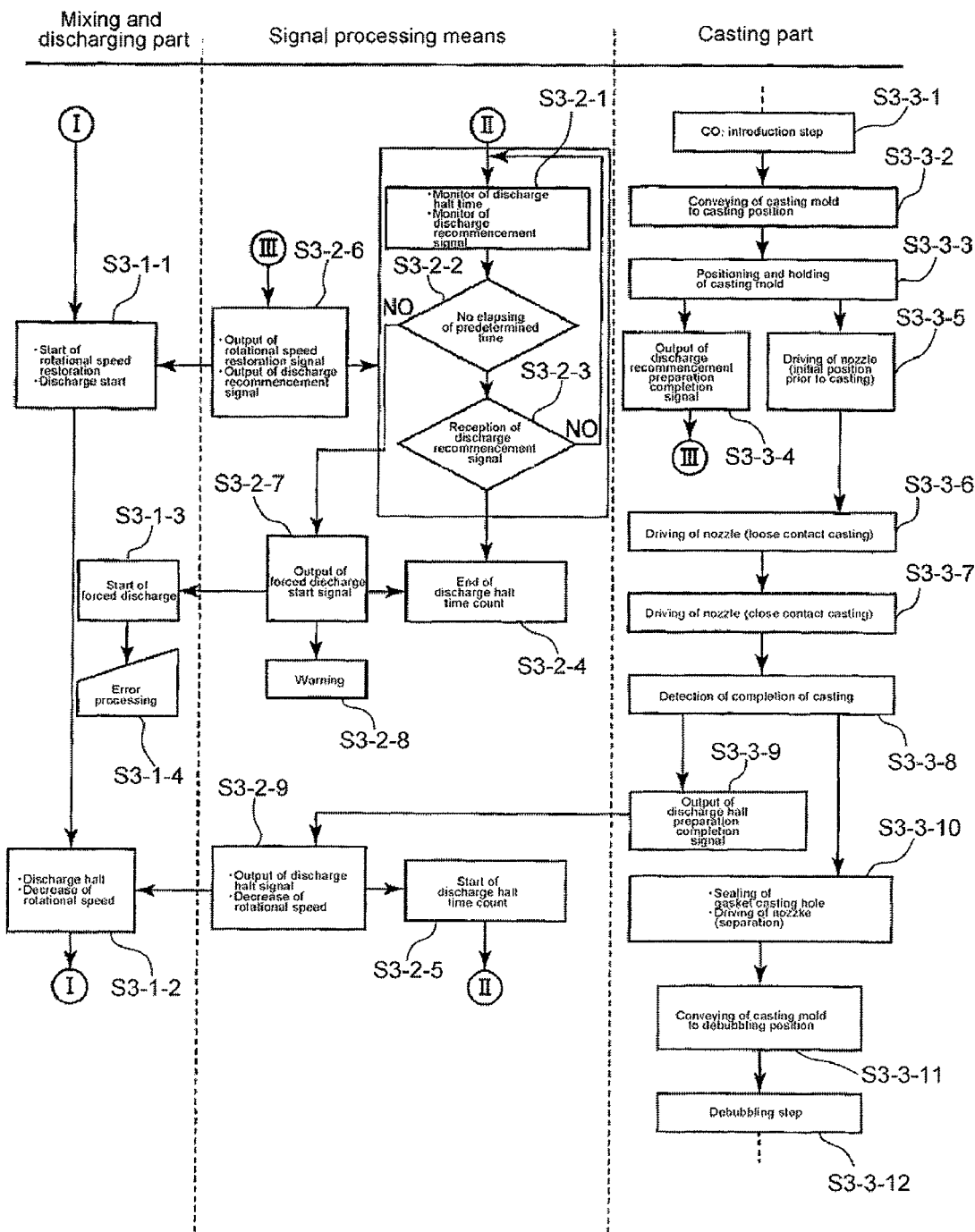

FIG. 14 shows the relation between the rotational speed of the stirrer and the discharge level from the mixing and discharging part when the rotational speed of the stirrer is reduced during a discharge halt and an increase in rotational speed is begun at the time when discharging is recommenced in the mixing and discharging part. FIG. 15 shows a drawing describing the transmission and reception of signals in the embodiment shown in FIG. 14. With the exception of steps relating to the rotational speed restoration signal, this embodiment is identical to the embodiment shown in FIG. 10.

In this embodiment, in addition to beginning of the count of the discharge halt time as well as beginning of monitoring of the discharge halt time and discharge recommencement signal, the signal processing means receiving of the discharge halt preparation completion signal from the casting part transmits the rotational speed reduction signal together with the discharge halt signal. (S-3-2-9, S3-2-5, S3-2-1, 2, 3). The mixing and discharging part receiving the discharge halt signal and the rotational speed reduction signal halts the discharge of the starting material liquid from the discharge outlet and reduces the rotational speed of the stirrer stirring the starting material liquid (S-3-1-2).

In addition, the signal processing means receiving the discharge halt preparation completion signal from the casting part generates the rotational speed restoration signal and discharge recommencement signal and transmits these signals to the mixing and discharging part (S3-2-6). The mixing and discharging part receiving these signals increases the rotational speed of the stirrer and starts the restoration of the rotational speed to the rotational speed prior to the discharge halt, as well as recommences the discharge of the starting material liquid from the discharge outlet (S3-1-1).

In this embodiment, the rotational speed is restored and the increase of rotational speed is halted during the discharge. No monitoring of the restoration of the rotational speed is conducted, but the restoration of the rotational speed can be detected by either the mixing and discharging part or the signal processing means.

Figure 16:
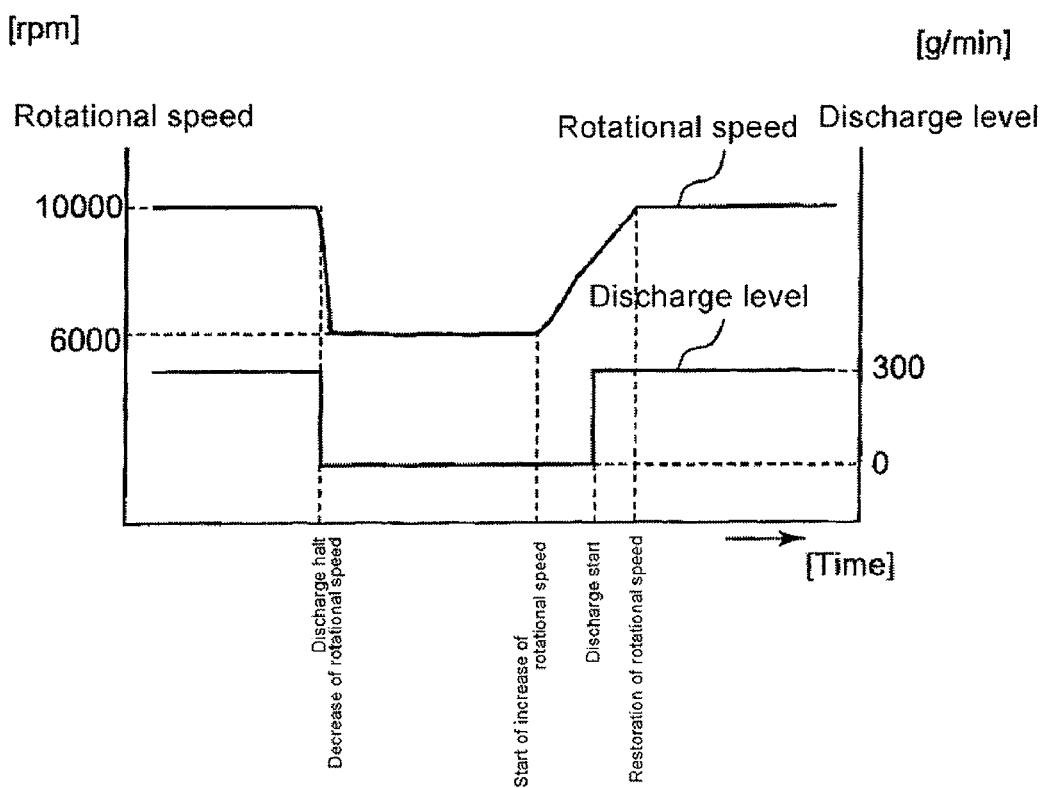

(D) The Case when the Rotational Speed is Changed During a Discharge Halt and the Increase in Rotational Speed is Continued Even after the Recommencement of Discharging (FIG. 16)

Figure 17:
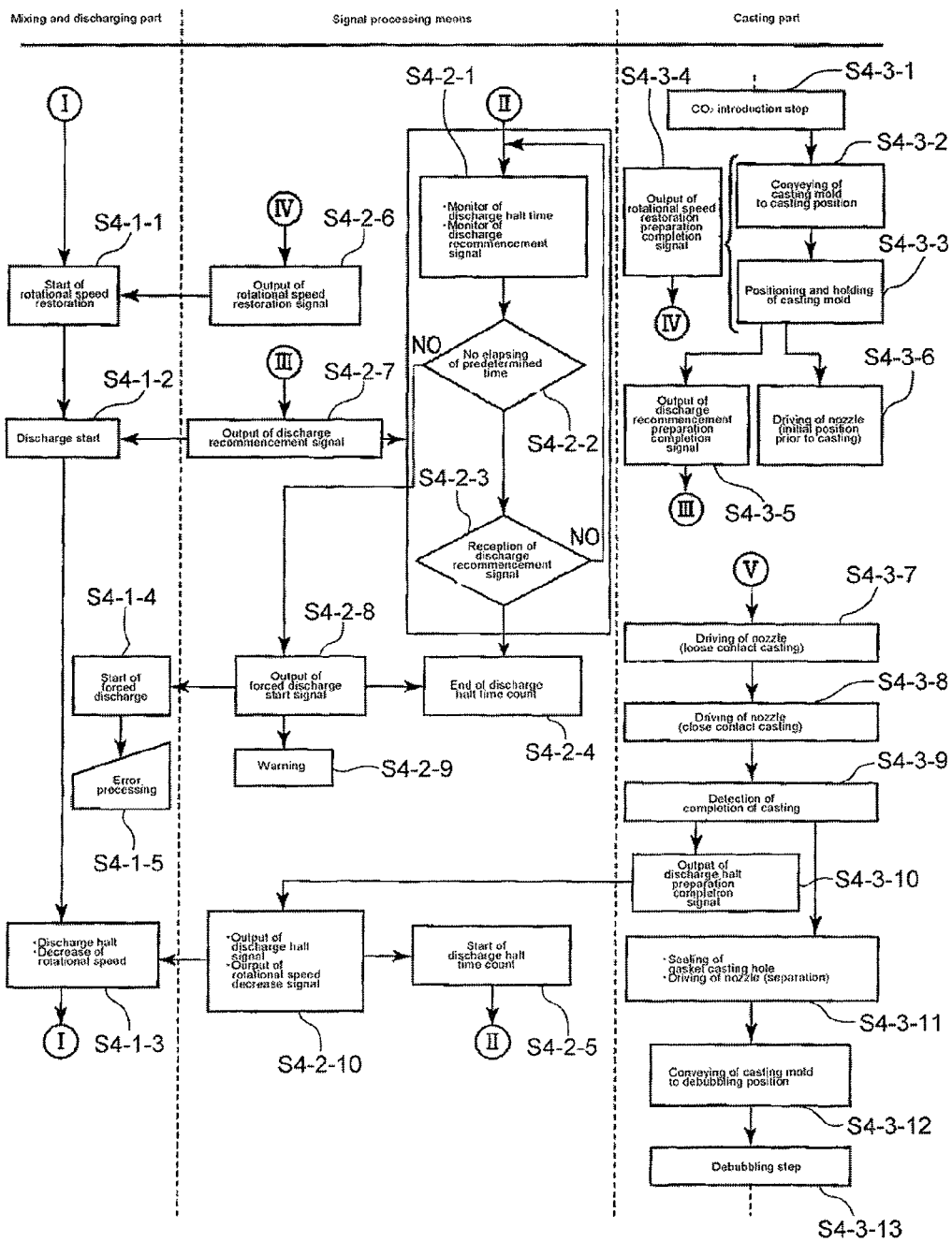

FIG. 16 shows the relation between the rotational speed of the stirrer and the discharge level from the mixing and discharging part when the rotational speed of the stirrer is reduced during a discharge halt, an increase in rotational speed is begun prior to recommencement of discharging, and the increase in rotational speed is continued even after the recommencement of discharging in the mixing and discharging part. FIG. 17 shows a drawing describing the transmission and reception of signals in the embodiment shown in FIG. 16. With the exception that steps relating to monitoring of the restoration of the rotational speed and monitoring of the discharge recommencement preparation completion signal are not conducted, this embodiment is identical to the embodiment shown in FIG. 12. That is, when the signal processing means receives a rotational speed restoration preparation completion signal from the casting part, it generates a rotational speed restoration signal and outputs it to the mixing and discharging part (S4-2-6). When it receives a discharge recommencement preparation completion signal, it generates a discharge recommencement signal and outputs it to the mixing and discharging part (S4-2-7).

Figure 18:
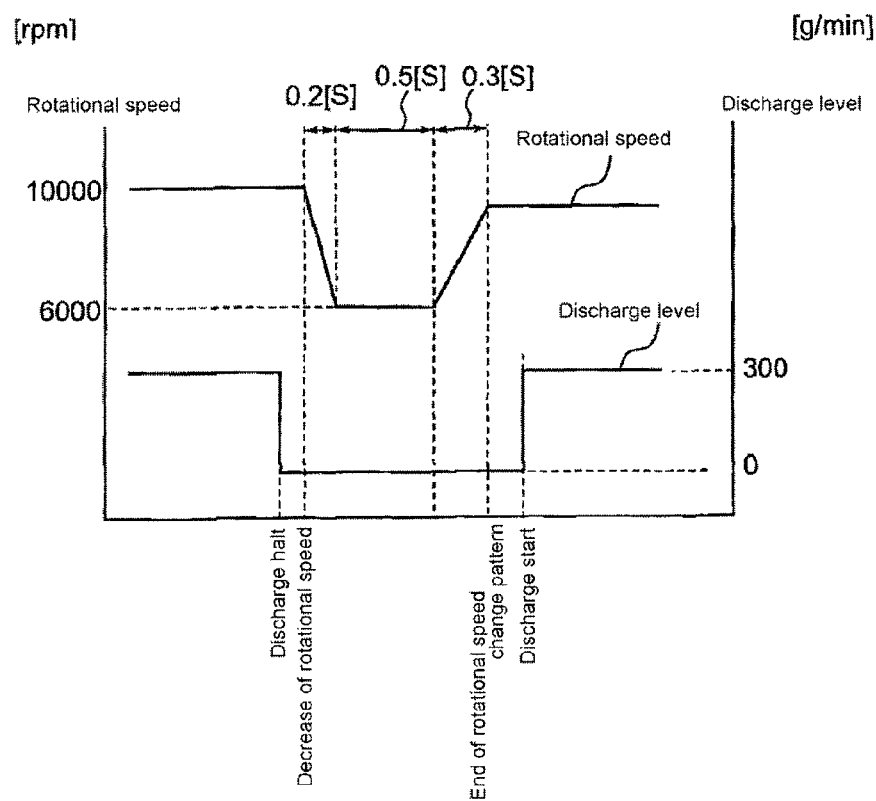

(E) The case when the rotational speed is changed according to a predetermined rotational speed change pattern during a discharge halt (FIG. 18)

Figure 19:
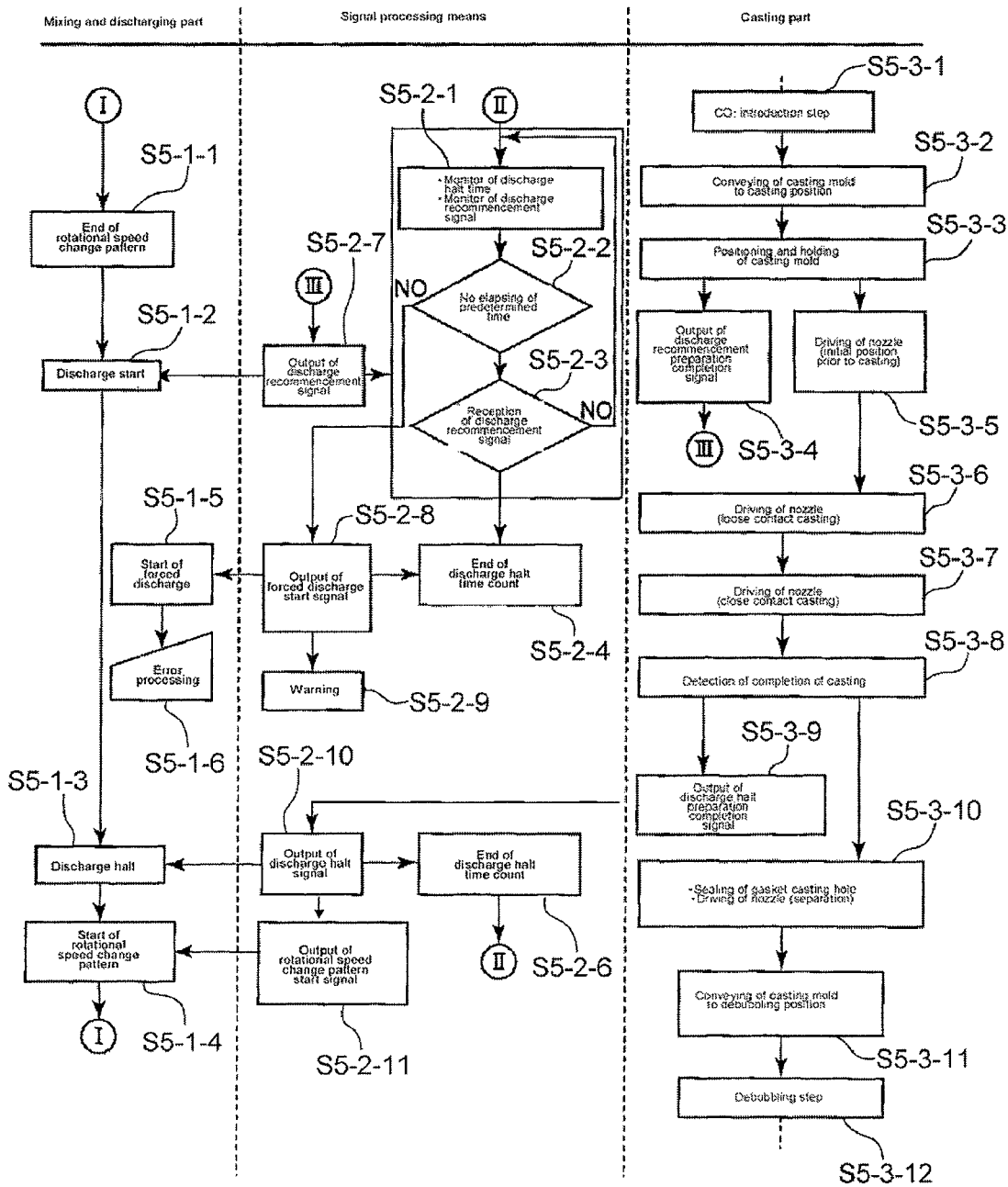

FIG. 18 shows the relation between the rotational speed of the stirrer and the discharge level from the mixing and discharging part when the rotational speed of the stirrer is decreased and increased during a discharge halt according to a predetermined change pattern in the mixing and discharging part. FIG. 19 shows a drawing describing the transmission and reception of signals in the embodiment shown in FIG. 18.

In the present embodiment, when the rotational speed of the stirrer is once reduced during a discharge halt and then the rotational speed is restored to the rotational speed before the discharge halt in the mixing and discharging part, the rotational speed of the stirrer changes according to the above-mentioned predetermined rotational speed change pattern and discharging is started before elapsing of a period of time from the discharge halt or from the reception of a discharge halt preparation completion signal. That is, in addition to beginning of the count of the discharge halt time as well as beginning of monitoring of the discharge halt time and discharge recommencement signal, the signal processing means receiving of the discharge halt preparation completion signal from the casting part transmits the discharge halt signal to the mixing and discharging part as well as transmits the rotational speed change pattern start signal to the mixing and discharging part (S5-2-10, S5-2-6, S5-2-1, 2, 3, S5-1-3, S5-2-11).

Once the mixing and discharging part receives the discharge halt signal, it halts the discharge (S5-1-4), and once it receives the rotational speed change pattern start signal, it reduces and restores the rotational speed of the stirrer according to the rotational speed change pattern, and then the operation according to the rotational speed change pattern is completed (S5-1-4, S5-1-1). In this embodiment, the discharge is restored after the completion of the rotational speed change pattern. Operation of the rotational speed change pattern is desirably begun by reception of a discharge halt signal. However, the rotational speed change pattern start signal can be a separate signal from the discharge halt signal. Steps other than rotational speed change are identical to those set forth above for the embodiment shown in FIG. 10.

In the rotational speed change pattern shown in FIG. 18, the rotational speed is reduced from 10,000 rpm to 6,000 rpm in 0.2 second, maintained at 6,000 rpm for 0.5 seconds, and increased from 6,000 rpm to 10,000 rpm in 0.3 second. However, the present invention is not limited to the embodiment shown in FIG. 19. It is also possible to devise several different rotational speed change patterns, and employ one of them as needed.

As set forth above, in the casting method of the present invention, the halting of the discharge of a starting material liquid from, and the recommencement of discharge by, a mixing and discharging part that are conducted based on signals from a casting part makes it possible to temporarily halt discharging, even when manufacturing plastic lenses from a high-viscosity starting material liquid having a rapid initial polymerization rate for which the halting of discharging has conventionally been difficult. Forced start of discharging by detection of casting part error can prevent a reduction in the optical characteristics of the lens obtained and the difficulty in recommencing discharging because of an excessively long discharge halt period. Further, controls based on the discharge halt period permit stable and automatic casting.

Specific examples have been described above based on the drawings. However, the present invention is not limited to the above embodiments, and can be variously modified.

Plastic Lens Starting Material Liquid Casting Apparatus

The present invention further relates to a plastic lens starting material liquid casting apparatus (also referred to as "casting apparatus", hereinafter) comprising a mixing and discharging part, a casting part, and a signal processing means conducting generation of a signal transmitted to the mixing and discharging part and transmission of the signal to the mixing and discharging part.

In the casting apparatus of the present invention, the mixing and discharging part comprises a stirring means stirring a plastic lens starting material in the mixing and discharging part, and comprises a function discharging the plastic lens starting material liquid mixed by the stirring means from the mixing and discharging part and a discharge halt recommencement function halting and recommencing the discharge by reception of a signal, and at least during a period when the plastic lens starting material liquid is discharged from the mixing and discharging part, continuously conducting supply of the plastic lens starting material liquid to the mixing and discharging part, mixing the supplied plastic lens starting material liquid in the mixing and discharging part, and discharging the mixed plastic lens starting material liquid from the mixing and discharging part, and during the discharge halt, the stirring means continues stirring, The discharge halt recommencement function of the mixing and discharging part preferably halt the discharge based on the discharge halt preparation completion signal transmitted by the casting part and recommence it based on the discharge recommencement preparation completion signal transmitted by the casting part or the forced discharge start signal transmitted by the signal processing means.

The casting part casts the plastic lens starting material liquid sequentially into multiple casting molds by conducting conveying the casting mold to a casting position, casting the plastic lens starting material liquid discharged from a mixing apparatus into the casting mold conveyed to the casting position, and conveying the casting mold into which the plastic lens starting material liquid has been cast away from the casting position repeatedly multiple times, and comprises a discharge halt preparation completion signal transmission function and a discharge recommencement preparation completion signal transmission function.

The signal processing means comprises a discharge halt signal transmission function receiving the discharge halt preparation completion signal transmitted by the casting part, generating a discharge halt signal based on the signal, and transmitting the discharge halt signal generated to the mixing and discharging part, a discharge recommencement signal transmission function receiving the discharge recommencement preparation completion signal transmitted by the casting part, generating a discharge recommencement signal based on the signal, and transmitting the discharge recommencement signal generated to the mixing and discharging part, and a forced discharge start signal transmission function generating a forced discharge start signal upon detection of elapsing a predetermined time following halting of the discharge or following reception of a discharge halt preparation completion signal of the mixing and discharging part and transmitting the signal to the mixing and discharging part.

The signal processing means desirably comprise a discharge halt time measuring element that measures a time that has elapsed following the halting of discharge of the mixing and discharging part or the reception of a discharge halt preparation completion signal and a storage element that stores the predetermined time, and generate the forced discharge start signal upon elapsing of the predetermined time stored in the storage element without reception of a discharge recommencement preparation completion signal transmitted by the casting part.

It is desirable that the mixing and discharging part comprises a stirrer stirring a plastic lens starting material liquid, and the signal processing means comprises a rotational speed monitoring element obtaining information of a rotational speed of the stirrer in the mixing and discharging part, generates a signal by detection by the rotational speed monitoring element of attainment of the rotational speed of the stirrer to a predetermined speed, and transmits the signal to the mixing and discharging part. Furthermore, the signal processing means can transmit to the mixing and discharging part a rotational speed changing signal (for example, a signal providing notification of rotational speed reduction start or rotational speed increase start). The mixing and discharging part can change the rotational speed of the stirrer by reception of the rotational speed changing signal. The rotational speed changing signal can be generated by the signal processing means based on a signal (such as a discharge halt preparation completion signal or rotational speed restoration preparation completion signal) transmitted to the signal processing means by the casting part.

The casting apparatus of the present invention can be suitably employed in the casting method of the present invention set forth above; the details thereof are as described above for the casting method of the present invention. The present invention further relates to a method of casting a plastic lens starting material liquid sequentially into multiple casting molds using the plastic lens starting material liquid casting apparatus described above. The details thereof are also as set forth above.

Plastic Lens Starting Material Liquid

The plastic lens starting material liquid that is cast into a casting mold by the casting method and casting apparatus of the present invention is not specifically limited, but the casting method and casting apparatus of the present invention are suitably employed in manufacturing a plastic lens from a starting material liquid with a high initial polymerization rate. For example, they are suitably employed for manufacturing a plastic lens from a starting material liquid that starts polymerization immediately after mixing and cures within 10 minutes. Since lenses with excellent optical characteristics can be obtained by the casting method and casting apparatus of the present invention, as set forth above, they are suitably employed for manufacturing a plastic eyeglass lens that is required to have high optical characteristics. In the present invention, "polymerizable component" means a component having a polymerizable group, for example, can be a monomer or a prepolymer.

The plural polymerizable components mentioned above preferably comprise the following components (A) and (B), more preferably consist of the following components (A) and (B).

Component (A): isocyanate terminal prepolymer in the form of a reaction product of an aliphatic diisocyanate having an intramolecular cyclic structure and a diol having an average molecular weight of 300-2,500.

Component (B): one or more aromatic diamines denoted by general formula (I). (In general formula (I), $R_1$, $R_2$ and $R_3$ are each independently any of a methyl, ethyl or thiomethyl group.)

[Chem.2]

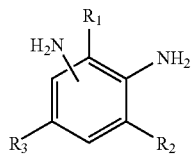

General formula (I)

Components (A) and (B) will be described below.

Isocyanate Terminal Prepolymer Component (A)

Component (A) is an isocyanate terminal prepolymer in the form of a reaction product of an aliphatic diisocyanate having an intramolecular cyclic structure and a diol having an average molecular weight of 300-2,500. Making the diisocyanate, one starting material of the aforementioned isocyanate terminal prepolymer, an aliphatic diisocyanate having an intramolecular cyclic structure facilitates control of the reaction during manufacturing or polymerizing the prepolymer and imparts suitable elasticity to the molded article finally obtained. Further, it imparts high heat resistance and good mechanical characteristics to the molded article obtained.

The aliphatic diisocyanate having an intramolecular cyclic structure is an aliphatic diisocyanate having a cyclic structure in the main chain or in the side chain. The cyclic structure may be alicyclic, aromatic, or heterocyclic. However, the aliphatic diisocyanate having an intramolecular cyclic structure is desirably an alicyclic diisocyanate from the perspective of preventing yellowing and maintaining adequate elasticity and hardness. Molded articles obtained with isocyanate having an aromatic ring tend to yellow more than those obtained with alicyclic diisocyanate; molded articles obtained with aliphatic chain-structured isocyanate tend to be softer and lose their shape more readily.

Examples of alicyclic diisocyanates are: 4,4'-methylenebis (cyclohexyl isocyanate), isophorone diisocyanate, 1,2-bis (isocyanate methyl)cyclohexane, 1,3-bis(isocyanate methyl) cyclohexane, 1,4-bis(isocyanate methyl)cyclohexane, 1,2-diisocyanate cyclohexane, 1,3-diisocyanate cyclohexane, and 1,4-diisocyanate cyclohexane. Examples of diisocyanates having aromatic rings are: m-xylylene diisocyanate, o-xylylene diisocyanate, p-xylylene diisocyanate, and m-tetramethylxylylene diisocyanate. It is particularly preferable that the alicyclic diisocyanate is at least one selected from the group consisting of 4,4'-methylenebis(cyclohexyl isocyanate), isophorone diisocyanate, and 1,3-bis(isocyanate methyl)cyclohexane.

The average molecular weight of the diol that is the other starting material of the isocyanate terminal prepolymer of component (A) is 300-2,500. In the present invention, "average molecular weight" means number average molecular weight.

When the average molecular weight of the diol is less than 300, toughness cannot be imparted to the molded article obtained, and when greater than 2,500, the molded article obtained becomes soft and does not retain its shape. The average molecular weight of the diol is desirably 400-1,000.

Examples of diols having an average molecular weight of 300-2,500 are polyether diols and polyester diols. These diols are preferred because of good compatibility with the other component. In the case of a diol of poor compatibility, it becomes necessary to add another component in the form of a compatibility enhancer to maintain the transparency of the molded article obtained, potentially resulting in loss of transparency.

Examples of such diols are: polyoxyethylene glycol, polyoxypropylene glycol, polyoxytetramethylene glycol, polyester diol comprised of ethylene glycol and adipic acid, polyester diol comprised of propylene glycol and adipic acid, polyester diol comprised of diethylene glycol and adipic acid, polyester diol comprised of 1,4-butane diol and adipic acid, polyester diol comprised of neopentyl glycol and adipic acid, polyester diol comprised of 1,6-hexanediol and adipic acid, polyester diol comprised of 1,10-decanediol and adipic acid, polyester diol comprised of 1,4-butanediol and sebacic acid, polycaprolactone diol comprised of ethylene glycol and ε-caprolactone, polycaprolactone diol comprised of propylene glycol and ε-caprolactone, polycaprolactone diol comprised of diethylene glycol and ε-caprolactone, polycaprolactone diol comprised of 1,4-butane diol and ε-caprolactone, polycaprolactone diol comprised of neopentyl glycol and ε-caprolactone, polycaprolactone diol comprised of 1,6-hexane diol and ε-caprolactone, polycaprolactone diol comprised of 1,10-decane diol and ε-caprolactone, and polycarbonate glycol. Preferred examples are: polyoxypropylene glycol, polyoxytetramethylene glycol, polyester diol comprised of 1,4-butane diol and adipic acid, polyester diol comprised of neopentyl glycol and adipic acid, polyester diol comprised of 1,6-hexane diol and adipic acid, and polyester diol comprised of 1,10-decane diol and adipic acid.

In the present invention, a diol comprising an intramolecular sulfur atom and having a molecular weight of 300-2,500 can be employed as a starting material of isocyanate terminal prepolymer component (A). Incorporation of a sulfur atom in a diol molecule permits an improvement of refractive index while suppressing decrease of abbe number. The existent state of a sulfur atom in a diol molecule is not specifically limited, but it is preferable that a sulfur atom is incorporated in a molecule by at least one bonding pattern among a sulfide bond, disulfide bond, thioester bond, dithioester bond, thiocarbonate bond and dithiocarbonate bond. By incorporating a sulfur atom by the above bonding pattern, component (A) is afforded a good compatibility with other components, and a molded article with no coloring and excellent transparency can be obtained. In contrast, a sulfur atom incorporated in the molecule by a bonding pattern other than above tends to deteriorate a compatibility of component (A) with other components. In that case, it becomes necessary to add another component in the form of a compatibility enhancer to maintain the transparency of the molded article obtained, potentially resulting in remarkable coloring. In view of the above matters, the other starting material of the isocyanate terminal prepolymer of component (A) preferably comprises an intramolecular sulfur atom by at least one bonding pattern among a sulfide bond, disulfide bond, thioester bond, dithioester bond, thiocarbonate bond and dithiocarbonate bond.

The isocyanate group content of isocyanate terminal prepolymer component (A) desirably falls within a range of 10-20 mass percent. When the above-stated isocyanate group content is equal to or greater than 10 mass percent, a molded article with high hardness can be obtained, and when the above-stated range is equal to or less than 20 mass percent, a molded article with high toughness (adequate strength) can be obtained. The above-stated isocyanate group content further preferably falls within a range of 11-15 mass percent.

Aromatic Diamine Component (B)

Component (B) is one or more aromatic diamines denoted by general formula (I) above. In general formula (I), $R_1$, $R_2$, and $R_3$ are each independently any of a methyl, ethyl, or thiomethyl group. Employing substituents $R_1$, $R_2$, and $R_3$ mentioned above can suppress crystallinity and enhance compatibility with the other components. When these substituents are absent or present in low numbers, crystallinity rises, resulting in handling difficulty. When employing the other substituents, compatibility with the other components deteriorates, resulting in apprehensively decreasing the transparency of the material obtained.

The following compounds are more specific examples of the above-stated aromatic diamines: 1,3,5-trimethyl-2,4-diaminobenzene, 1,3,5-trimethyl-2,6-diaminobenzene, 1,3,5-triethyl-2,4-diaminobenzene, 1,3,5-triethyl-2,6-diaminobenzene, 1,3,5-trithiomethyl-2,4-diaminobenzene, 1,3,5-trithiomethyl-2,6-diaminobenzene, 3,5-diethyl-2,4-diaminotoluene, 3,5-diethyl-2,6-diaminotoluene, 3,5-dithiomethyl-2,4-diaminotoluene, 3,5-dithiomethyl-2,6-diaminotoluene, 1-ethyl-3,5-dimethyl-2,4-diaminobenzene, 1-ethyl-3,5-dimethyl-2,6-diaminobenzene, 1-ethyl-3,5-dithiomethyl-2,4-diaminobenzene, 1-ethyl-3,5-dithiomethyl-2,6-diaminobenzene, 1-thiomethyl-3,5-dimethyl-2,4-diaminobenzene, 1-thiomethyl-3,5-dimethyl-2,6-diaminobenzene, 1-thiomethyl-3,5-diethyl-2,4-diaminobenzene, 1-thiomethyl-3,5-diethyl-2,6-diaminobenzene, 3-ethyl-5-thiomethyl-2,4-diaminotoluene, 3-ethyl-5-thiomethyl-2,6-diaminotoluene, and 3-thiomethyl-5-ethyl-2,4-diaminotoluene.

In the above-listed aromatic diamines, $R_1$ is desirably a methyl group and $R_2$ and $R_3$ each desirably represent either an ethyl group or thiomethyl group, in which case the molded article obtained tends not to haze and can be imparted with adequate toughness. More specific examples of the above-stated aromatic diamines are: 3,5-diethyl-2,4-diaminotoluene, 3,5-diethyl-2,6-diaminotoluene, 3,5-dithiomethyl-2,4-diaminotoluene, and 3,5-dithiomethyl-2,6-diaminotoluene.

As for the mixing ratio of components (A) and (B), the molar ratio of the isocyanate group of component (A) with respect to the amino group of component (B) desirably falls within a range of 1.00-1.15 from the perspective of achieving adequate toughness (strength). The above-stated molar ratio further preferably falls within a range of 1.02-1.12.

To the extent that the transparency and strength of the molded article are not lost, additives such as mold release agents, anti-oxidants, ultraviolet stabilizers, color blockers, and the like may be added as needed to the plastic lens starting material liquid. Examples of additives are described in columns 6 and 7 of U.S. Pat. No. 6,127,505; however, the present invention is not limited thereto.

Casting Mold

The casting mold into which the plastic lens starting material liquid is cast is not specifically limited. However, when casting the mixed liquid of the above-described component (A) and component (B), the casting mold, that has an internal cavity and has at diametrically opposed positions a casting hole for casting the starting material liquid into the cavity and a discharge hole for discharging gases in the cavity or the mixed liquid to the exterior of the casting mold, is preferably employed. The above casting mold can be one having a mold for forming one side of the lens and a mold for forming the other side thereof that are positioned opposite at a prescribed interval, a circular gasket is positioned around said two molds, and a cavity is formed with said molds and gasket.

In addition, as the above gasket, the following gasket is preferable.

A gasket for molding plastic lens comprised of a cylindrical member comprising openings for fitting by insertion a first mold and second mold comprising a molding surface for forming an optically functional surface of plastic lenses, characterized in that said cylindrical member has a casting inlet part and a discharge outlet part on an outer wall surface thereof, said casting inlet part has a casting tube part having a through-hole (casting hole) inside and a casting inlet apical part provided on an end part of said casting tube part, where an inside of said cylindrical member is communicated with an outside thereof through said casting hole, said discharge outlet part has a discharge hole communicating the inside of said cylindrical member with the outside thereof, said gasket has said casting hole and discharge hole at diametrically opposed positions, said casting inlet apical part has an opening of said casting hole and a inclined plane around the opening.

The casting mold can be fabricated by holding a first mold and second mold detachably in said openings of the gasket mentioned above so that a molding surface of the first mold and a molding surface of the second mold are positioned opposite at a prescribed interval to form a cavity corresponding to a lens shape within said cylindrical member. Such a casting mold will be described based on the drawings.

Figure 5:
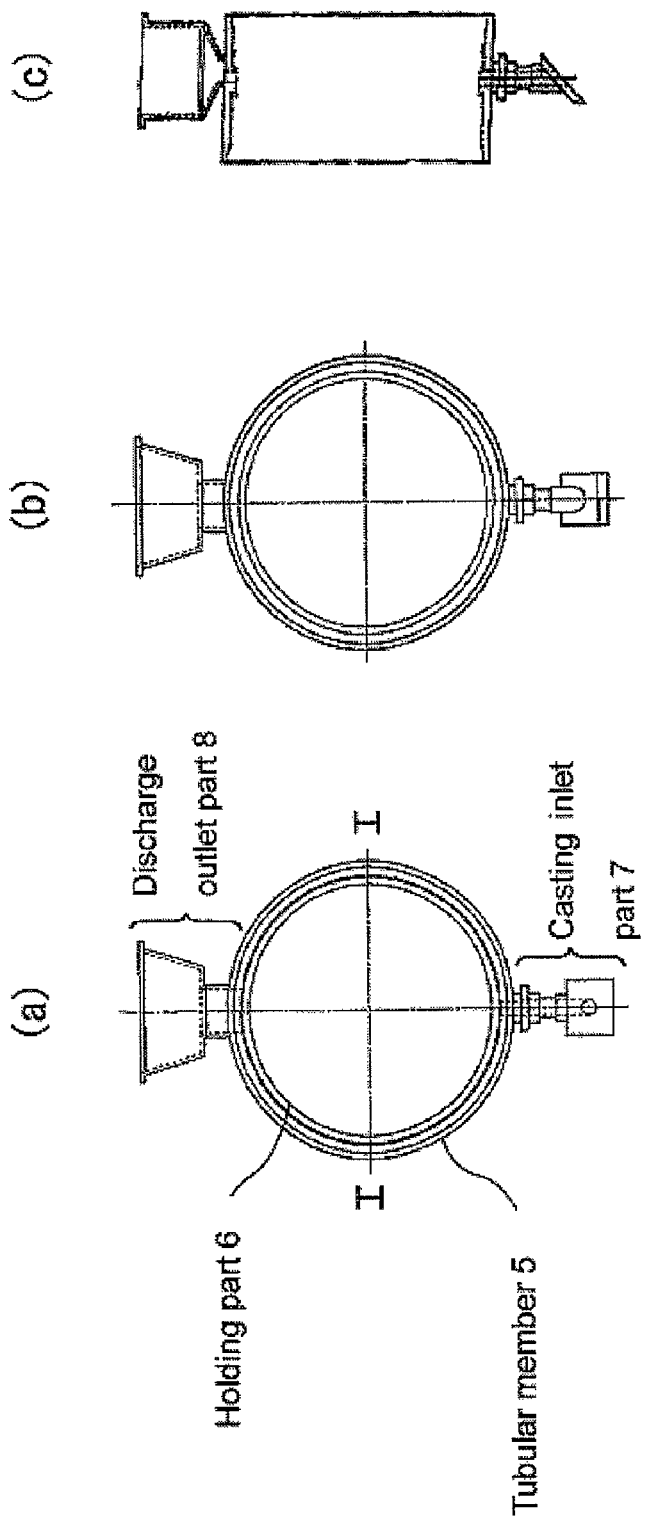

FIG. 5 is a top view of a gasket for molding plastic lenses. FIG. 6 is a sectional view showing a lens mother die installed in the gasket shown in FIG. 5. As shown in FIG. 6, cavity 4 is formed within gasket 1 by installing lens mother die 2 comprised of first mold 2A and second mold 2B.

Gasket 1 comprises: cylindrical tubular member 5 having openings into which are fitted by insertion first mold 2A and second mold 2B, respectively; holding part 6 provided in protruding fashion in the inner wall surface of tubular member 5 to contact at least the perimeter portion of first mold 2A and thus hold first mold 2A in position; casting inlet part 7 positioned on the outer wall surface of tubular member 5 for casting a starting material liquid into cavity 4; and discharge outlet part 8, also positioned on the outer wall surface of tubular member 5, for discharging gases and excess starting material liquid from the cavity during casting. Gasket 1 can be comprised of an elastic resin, examples of which are: ethylene acetate vinyl copolymer, polyethylene, polyethyl acrylate, and silicone rubber. A further example is a mixed product of polypropylene and ethylene propylene rubber (for example, the product Santoprene, made by Advanced Elastomer Systems Corp.). This material is desirable because of high resistance to heat.

Tubular member 5, holding part 6, casting inlet part 7, and discharge outlet part 8 can be integrally molded by injection molding. First mold 2A and second mold 2B constituting lens mother die 2 are comprised of glass or the like and are round in shape when viewed from the front. The rims of the first and second molds are desirably of a shape capable of remaining in contact with the inner wall surface of tubular member 5 of gasket 1 without a gap.

First mold 2A and second mold 2B have molding surfaces for forming the optically functional surfaces of the plastic lens. For example, first mold 2A can be a convex mold (also referred to as "lower mold", hereinafter) having a molding surface on the convex surface side for forming the rear surface (concave surface) of the plastic lens, and second mold 2B can be a concave mold (also referred to as "upper mold", hereinafter) having a molding surface on the concave surface side for forming the front surface (convex surface) of the plastic lens; however, these are not limitations. The inner diameter of tubular member 5 of gasket 1 can be substantially identical or somewhat smaller than the outer diameter of first mold 2A and second mold 2B. However, as set forth above, the shape is suitably one capable of maintaining contact with the inner wall surface of tubular member 5 without a gap. The molds installed in the gasket can be nipped in place with springs or the like exerting forces directed toward the interior of tubular member 5 from either side as necessary to secure them to the gasket.

It suffices for tubular member 5 to have a height capable of ensuring the thickness of the rim portion of the lens to be molded (the thickness of the rim part of cavity 4) and the thickness required to hold the rims of first mold 2A and second mold 2B. When second mold 2B is of a convex shape facing the opening of tubular member 5, the height of tubular member 5 is desirably set so that the tip of the convex surface of second mold 2B does not protrude to the outside from the outer wall surface of the tubular member.

A holding part may be provided to hold at least first mold 2A in position, with no holding part provided to hold second mold 2B in position. In that case, second mold 2B is pushed into the gasket to a prescribed position and held by the elasticity of the gasket. Further, protrusions for holding first mold 2A and protrusions for holding second mold 2B can be separately provided as holding parts. Still further, the holding parts may hold first mold in position by contacting the rim of first mold 2A and hold second mold 2B in position by contacting the rim portion of second mold 2B. The beltlike holding part shown in FIG. 5 is an example of such a holding part.

In the mode shown in FIGS. 5 and 6, holding part 6 of gasket 1 is a beltlike protruding belt formed circumferentially around the inner wall surface of tubular member 5. The upper and lower surfaces of holding part 6 come into contact with the rim of the molding surface of first mold 2A and the rim of the molding surface of second mold 2B; the height of these contact portions can be suitably established in conformity with the shape of the rims of the molding surfaces of the molds. In FIG. 2, first mold 2A having a spherical molding surface and second mold 2B are installed in the gasket shown in FIG. 1. The position (height) of the upper surface and the position (height) of the lower surface respectively can be made identical in the circumferential direction of beltlike holding part 6. At other times, the position (height) of the upper surface and the position (height) of the lower surface differ in the circumferential direction of beltlike holding part 6. When the holding part of the gasket is beltlike, beltlike protrusions for holding first mold 2A and second mold 2B may be integrally formed or may be formed separately.

The structure of holding part 6 is not limited to the above-described embodiment; any protrusion having a portion capable of contacting the rim of the molding surface of the mold will suffice. Reference can be made to Japanese Unexamined Patent Publication (KOKAI) No. 2006-205710 for the details of the casting mold set forth above.

Method of Manufacturing Plastic Lens

The present invention further relates to a method of manufacturing a plastic lens by casting a plastic lens starting material liquid into a casting mold by the casting method of the present invention and polymerizing the plastic lens starting material liquid in the casting mold to obtain a molded article. Each step is as set forth above. Reference can be suitably made to Japanese Unexamined Patent Publication (KOKAI) Nos. 2004-291606, 2006-205710, 2006-231600, and the like.

INDUSTRIAL APPLICABILITY

The present invention permits manufacturing of a plastic lens with reduced optical defects. The present invention is especially suited to manufacturing of eyeglass lenses.

DETAILED DESCRIPTION OF THE DRAWINGS

FIG. 1 It is a drawing describing part of a casting apparatus that can be employed in the method of casting a plastic lens starting material liquid of the present invention.

FIG. 2 It is a detailed drawing of filling part 82 shown in FIG. 1.

FIG. 3 It shows an example of a conveying pallet.

FIG. 4 It shows the conveying pallet shown in FIG. 3, upon which the casting mold is mounted.

FIGS. 5a-5c They are a top view of a gasket for molding plastic lens.

FIG. 6 It is a sectional view showing a lens mother die installed in the gasket shown in FIG. 5.

FIG. 7 is a descriptive drawing of the structure of a RIM machine.

FIG. 8 It is a drawing describing the structure of the mixing and discharging part of a RIM machine.

FIG. 9 It shows the relation between the rotational speed of the stirrer and the discharge level of the mixing and discharging part when a constant rotational speed of the stirrer is maintained even during discharge halt in the mixing and discharging part.

FIG. 10 It is a descriptive drawing of signal transmission and reception in the embodiment shown in FIG. 9.

FIGS. 11a-11d They show an example of the operating track of a casting nozzle in the casting step.

FIG. 12 It shows the relation between the rotational speed of the stirrer and the discharge level from the mixing and discharging part when the rotational speed of the stirrer is reduced during a discharge halt, an increase in the rotational speed is begun before recommencement of discharging, and restoration of the rotational speed to the rotational speed before the discharge halt is confirmed prior to recommencing discharge in the mixing and discharging part.

FIG. 13 It shows a drawing describing the transmission and reception of signals in the embodiment shown in FIG. 12.

FIG. 14 It shows the relation between the rotational speed of the stirrer and the discharge level from the mixing and discharging part when the rotational speed of the stirrer is reduced during a discharge halt and an increase in rotational speed is begun at the time when discharging is recommenced in the mixing and discharging part.

FIG. 15 It shows a drawing describing the transmission and reception of signals in the embodiment shown in FIG. 14.

FIG. 16 It shows the relation between the rotational speed of the stirrer and the discharge level from the mixing and discharging part when the rotational speed of the stirrer is FIG. 17 It shows a drawing describing the transmission and reception of signals in the embodiment shown in FIG. 16.

FIG. 18 It shows the relation between the rotational speed of the stirrer and the discharge level from the mixing and discharging part when the rotational speed of the stirrer is decreased and increased during a discharge halt according to a predetermined change pattern in the mixing and discharging part.

FIG. 19 It shows a drawing describing the transmission and reception of signals in the embodiment shown in FIG. 18.

The invention claimed is:

1. A method of casting a plastic lens starting material liquid,
   using a casting apparatus comprising at least a mixing and discharging part and a casting part,
   comprising mixing a plastic lens starting material liquid by stirring in the mixing and discharging part and discharging the mixed plastic lens starting material liquid from the mixing and discharging part, and, at least during a period when the plastic lens starting material liquid is discharged from the mixing and discharging part, continuously conducting supply of the plastic lens starting material liquid to the mixing and discharging part, mixing the supplied plastic lens starting material liquid in the mixing and discharging part, and discharging the mixed plastic lens starting material liquid from the mixing and discharging part, and
   in the casting part, casting the plastic lens starting material liquid sequentially into multiple casting molds by conducting conveying the casting mold to a casting position, casting the plastic lens starting material liquid discharged from the mixing and discharging part into the casting mold conveyed to the casting position, and conveying the casting mold into which the plastic lens starting material liquid has been cast away from the casting position repeatedly multiple times, characterized by,
   halting the discharge of the plastic lens starting material liquid from the mixing and discharging part based on a discharge halt preparation completion signal transmitted by the casting part,
   recommencing the discharge that has been halted (1) at least based on a discharge recommencement preparation completion signal transmitted by the casting part or (2) by reception by the mixing and discharging part of a forced discharge start signal transmitted upon elapsing a predetermined time following halting of the discharge or following reception of the discharge halt preparation completion signal without transmission of a discharge recommencement preparation completion signal by the casting part, and
   continuing the stirring in the mixing and discharging part during the period when the discharge is halted.

2. The method of casting a plastic lens starting material liquid according to claim 1, wherein the casting apparatus further comprises a signal processing means that generates a signal transmitted to the mixing and discharging part and transmits the signal to the mixing and discharging part.

3. The method of casting a plastic lens starting material liquid according to claim 1, wherein the mixing and discharging part halts the discharge by reception of a discharge halt signal generated based on the discharge halt preparation completion signal.

4. The method of casting a plastic lens starting material liquid according to claim 1, wherein, in the above (1), the mixing and discharging part recommences the discharge by reception of a discharge recommencement signal generated based on the discharge recommencement preparation completion signal.

5. The method of casting a plastic lens starting material liquid according to claim 2, wherein the signal processing means comprises a discharge halt time measuring element that measures a time that has elapsed following the halting of discharge or the reception of a discharge halt preparation completion signal and a storage element that stores the predetermined time, and, in the above (2), the discharge is recommenced by reception by the mixing and discharging part of the forced discharge start signal transmitted by the signal processing means upon elapsing of the predetermined time stored in the storage element without reception of a discharge recommencement signal transmitted by the casting part.

6. The method of casting a plastic lens starting material liquid according to claim 1, wherein the stirring of the plastic lens starting material liquid is carried out by rotating a stirrer comprised in the mixing and discharging part.

7. The method of casting a plastic lens starting material liquid according to claim 6, wherein stirring is conducted during the period when the discharge is halted with a rotational speed lower than that in the stirring before the discharge halt, and then the rotational speed is increased to restore to the rotational speed before the discharge halt.

8. The method of casting a plastic lens starting material liquid according to claim 7, wherein the signal processing means comprises a rotational speed monitoring element obtaining information of a rotational speed of the stirrer in the mixing and discharging part, and the recommencement of the discharge halted is conducted after the casting part transmits the discharge recommencement preparation completion signal and the rotational speed monitoring element detects that the rotational speed of the stirrer has restored to the rotational speed before the discharge halt.

9. The method of casting a plastic lens starting material liquid according to claim 1, wherein the plastic lens starting material liquid is comprised of the following component (A) and component (B):
   Component (A): isocyanate terminal prepolymer in the form of a reaction product of an aliphatic diisocyanate having an intramolecular cyclic structure and a diol having an average molecular weight of 300-2,500;
   Component (B): one or more aromatic diamines denoted by general formula (I). (In general formula (I), $R_1$, $R_2$ and $R_3$ are each independently any of a methyl group, ethyl group or thiomethyl group)

[Chem.1]

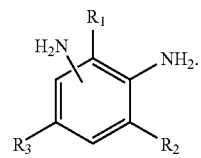

General formula (I)

10. A plastic lens starting material liquid casting apparatus comprising a mixing and discharging part, a casting part, and a signal processing means conducting generation of a signal transmitted to the mixing and discharging part and transmission of the signal to the mixing and discharging signal, wherein the mixing and discharging part comprises a stirring means stirring a plastic lens starting material in the mixing and discharging part, and comprises a function discharging the plastic lens starting material liquid mixed by the stirring means from the mixing and discharging part and a discharge halt recommencement function halting and recommencing the discharge by reception of a signal, and at least during a period when the plastic lens starting material liquid is discharged from the mixing and discharging part, continuously conducting supply of the plastic lens starting material liquid to the mixing and discharging part, mixing the supplied plastic lens starting material liquid in the mixing and discharging part, and discharging the mixed plastic lens starting material liquid from the mixing and discharging part, and during the discharge halt, the stirring means continues stirring, the casting part casts the plastic lens starting material liquid sequentially into multiple casting molds by conducting conveying the casting mold to a casting position, casting the plastic lens starting material liquid discharged from a mixing apparatus into the casting mold conveyed to the casting position, and conveying the casting mold into which the plastic lens starting material liquid has been cast away from the casting position repeatedly multiple times, and comprises a discharge halt preparation completion signal transmission function and a discharge recommencement preparation completion signal transmission function, the signal processing means comprises a discharge halt signal transmission function receiving the discharge halt preparation completion signal transmitted by the casting part, generating a discharge halt signal based on the signal, and transmitting the discharge halt signal generated to the mixing and discharging part, a discharge recommencement signal transmission function receiving the discharge recommencement preparation completion signal transmitted by the casting part, generating a discharge recommencement signal based on the signal, and transmitting the discharge recommencement signal generated to the mixing and discharging part, and a forced discharge start signal transmission function generating a forced discharge start signal upon detection of elapsing a predetermined time following halting of the discharge or following reception of a discharge halt preparation completion signal of the mixing and discharging part and transmitting the signal to the mixing and discharging part.

11. The plastic lens starting material liquid casting apparatus according to claim 10, wherein the discharge halt recommencement function of the mixing and discharging part halts the discharge based on the discharge halt preparation completion signal transmitted by the casting part, and recommences based on the discharge recommencement preparation completion signal transmitted by the casting part or the forced discharge start signal transmitted by the signal processing means.

12. The plastic lens starting material liquid casting apparatus according to claim 10, wherein the signal processing means comprises a discharge halt time measuring element that measures a time that has elapsed following the halting of discharge of the mixing and discharging part or the reception of a discharge halt preparation completion signal and a storage element that stores the predetermined time, and generates the forced discharge start signal upon elapsing of the predetermined time stored in the storage element without reception of a discharge recommencement preparation completion signal transmitted by the casting part.

13. The plastic lens starting material liquid casting apparatus according to claim 10, wherein the mixing and discharging part comprises a stirrer stirring a plastic lens starting material liquid, the signal processing means comprises a rotational speed monitoring element obtaining information of a rotational speed of the stirrer in the mixing and discharging part, generates a signal by detection by the rotational speed monitoring element of attainment of the rotational speed of the stirrer to a predetermined speed, and transmits the signal to the mixing and discharging part.

14. A method of casting a plastic lens starting material liquid sequentially into multiple casting molds using the plastic lens starting material liquid casting apparatus according to claim 10.

15. A method of manufacturing a plastic lens by casting a plastic lens starting material liquid into a casting mold by the method according to claim 1 and polymerizing the plastic lens starting material liquid in the casting mold to obtain a molded article.

16. The method of casting a plastic lens starting material liquid according to claim 1 wherein the casting part that has detected a completion of casting of starting material liquid transmits said discharge halt preparation completion signal.

17. The method of casting a plastic lens starting material liquid according to claim 1 wherein, once a next casting mold has been placed in the casting position, the casting part transmits said discharge recommencement preparation completion signals.

* * * * *